United States Patent [19]

Vander Meer et al.

[11] Patent Number: 4,468,603
[45] Date of Patent: Aug. 28, 1984

[54] LOAD VOLTAGE-CURRENT DISPLACEMENT REGULATOR MOTOR CONTROL SYSTEM

[75] Inventors: James C. Vander Meer, Brookfield; Robert W. Spink, Wauwatosa, both of Wis.

[73] Assignee: Eaton Corporation, Cleveland, Ohio

[21] Appl. No.: 250,984

[22] Filed: Apr. 3, 1981

[51] Int. Cl.³ .......................... H02P 5/40; H02P 1/26; H02P 1/28
[52] U.S. Cl. .................................. 318/779; 318/729; 318/778
[58] Field of Search ............... 318/778, 806, 798, 729; 323/321, 322

[56] References Cited

U.S. PATENT DOCUMENTS

| | | | |
|---|---|---|---|
| 3,593,078 | 7/1971 | Domshy | 318/778 |
| 3,670,237 | 6/1972 | Hubel et al. | 318/778 |
| 4,052,648 | 10/1977 | Nola | 318/812 |
| 4,070,605 | 1/1978 | Hoeppner | 318/741 |
| 4,084,406 | 4/1978 | Brenneman | 318/779 |
| 4,259,845 | 4/1981 | Norbeck | 318/806 |
| 4,291,264 | 9/1981 | Seimon | 318/729 |
| 4,317,074 | 2/1982 | Erth | 318/798 |
| 4,320,332 | 3/1982 | Sugimoro | 318/798 |
| 4,333,046 | 6/1982 | Lee | 318/729 |
| 4,355,274 | 10/1982 | Bourbeau | 318/729 |
| 4,361,793 | 11/1982 | Nordell | 318/729 |
| 4,384,243 | 5/1983 | Muskovac | 318/729 |

OTHER PUBLICATIONS

Le-Huy et al., "A Self-Controlled Synchronous Motor Drive Using Terminal Voltage Sensing," IAS Meeting 1980, Cincinnati, Oh., Sep. 28–Oct. 3, 1980, pp. 562-569.
Sen et al., "Induction Motor Drives with Microcomputer Control System," IAS Annual Meeting 1980, Cincinnati, Oh., Sep. 28–Oct. 3, 1980, pp. 653-662.
"Fast-Response Power Saver for Induction Motor" NASA Tech. Brief, Spring 1979, Marshall Space Flight Center, Ala.
"Improved Power-Factor Controller" NASA Tech. Brief, Summer 1980, Marshall Space Flight Center, Ala.

Primary Examiner—David Smith, Jr.
Attorney, Agent, or Firm—C. H. Grace; W. A. Autio

[57] ABSTRACT

A three-phase motor control system (FIG. 1) having a current control regulator (CCR) that includes adjustable current ramp time or adjustable current level during starting and acceleration and incorporates a load voltage-current displacement regulator (VCFB) that automatically becomes effective when the motor approaches synchronous speed, thereby to reduce the power input to the motor to what is needed to run the load, thus saving energy. Additionally, a second quadrant detector (SQD) senses overhauling load conditions and operates a gate (NG) to lock out the load voltage-current displacement feedback signal thereby allowing the reference signal to place the motor across the line until the motor operation returns to the motoring quadrant. The system further includes means (24 in FIG. 2h) affording integral control and means (30 in FIG. 2h) affording proportional control of either the current control or the load voltage-current displacement control signal, with the gain of the proportional control being individually adjustable. The integral control is provided with high gain means (FET in FIG. 2h) that is rendered effective by a switch (TR in FIG. 2h) during current control and alternative low gain means (P4 in FIG. 2h) that is substituted during load voltage-current displacement control, the gain of the latter being individually adjustable.

18 Claims, 16 Drawing Figures

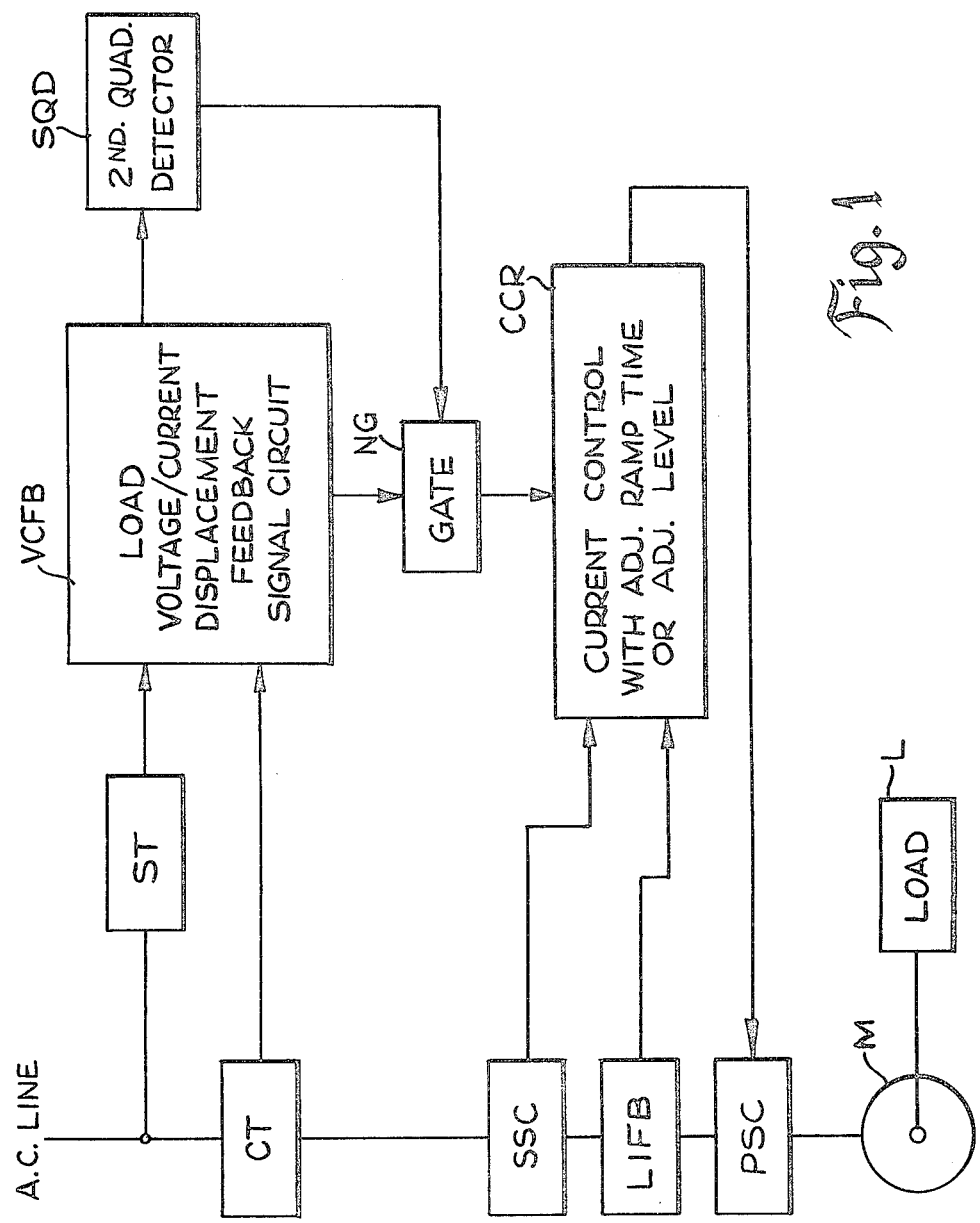

CCR

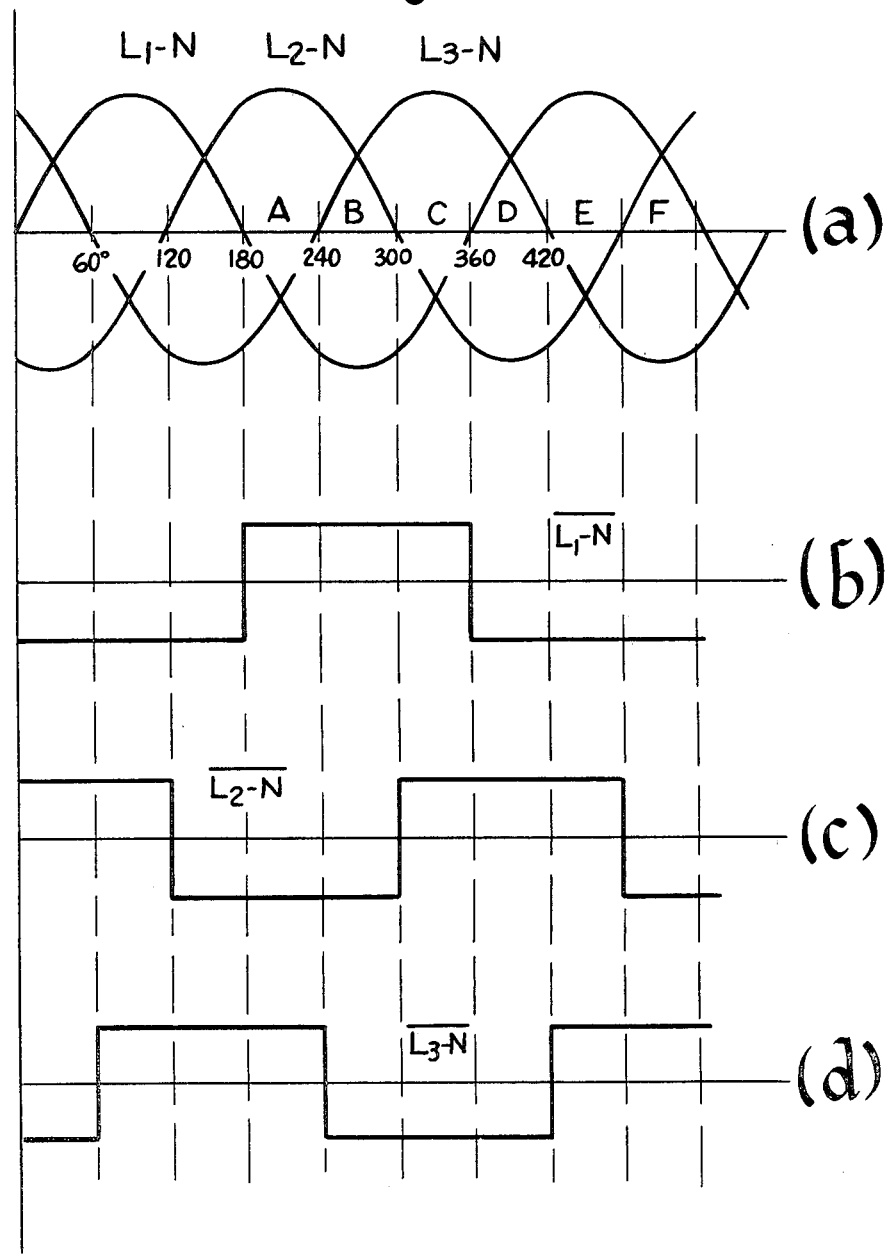

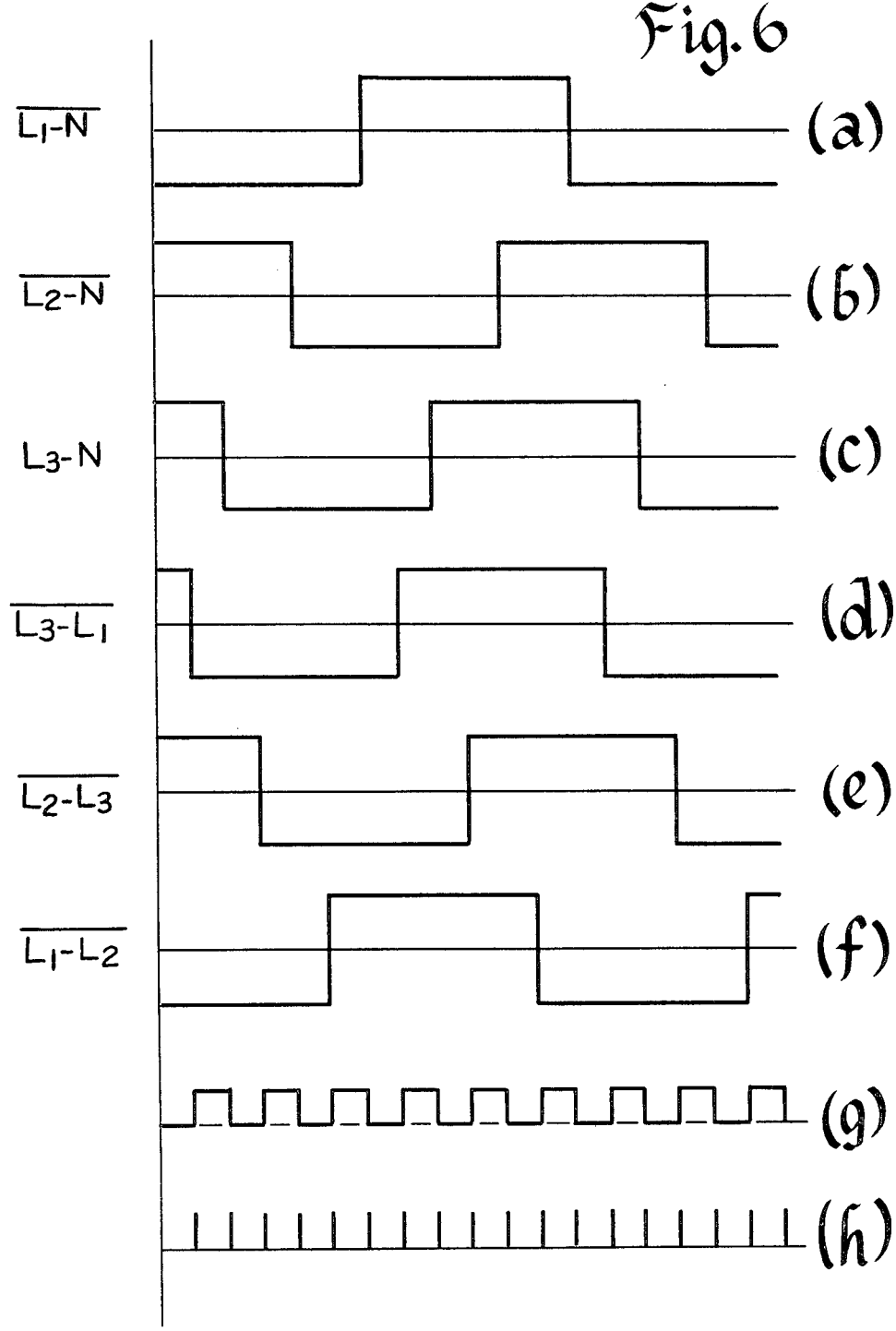

tem for an A.C. induction motor that samples line voltage and current through the motor and decreases power input to the motor proportional to the detected phase displacement between current and voltage to thereby provide less power to the motor as it is less loaded. For a three-phase motor, three of the control systems illustrated in this patent would be used, one being connected in each of the three phases with each referenced to ground in the case of a wye-connected motor. In a delta-connected motor, a triac and sampling resistor is placed in series with each winding of the motor and the voltage is taken across the two power leads for the respective winding.

LOAD VOLTAGE-CURRENT DISPLACEMENT REGULATOR MOTOR CONTROL SYSTEM

BACKGROUND OF THE INVENTION

Power factor responsive control systems for alternating current motors have been known heretofore. For example, F. J. Nola U.S. Pat. No. 4,052,648, dated Oct. 4, 1977, shows a single-phase power factor control system for an A.C. induction motor that samples line voltage and current through the motor and decreases power input to the motor proportional to the detected phase displacement between current and voltage to thereby provide less power to the motor as it is less loaded. For a three-phase motor, three of the control systems illustrated in this patent would be used, one being connected in each of the three phases with each referenced to ground in the case of a wye-connected motor. In a delta-connected motor, a triac and sampling resistor is placed in series with each winding of the motor and the voltage is taken across the two power leads for the respective winding.

Also, C. L. Wanlass U.S. Pat. No. 4,152,630, dated May 1, 1979, shows an A.C. induction motor that uses capacitors and a control winding on the stator to cause the motor to consume considerably less electrical energy than conventional motors.

While these prior systems have been useful for their intended purposes, this invention relates to improvements thereover.

SUMMARY OF THE INVENTION

An object of the invention is to provide an improved plural-phase motor control system.

A more specific object of the invention is to provide an improved load voltage-current displacement regulator for an alternating current motor control system to improve the operating efficiency thereof.

Another specific object of the invention is to provide a three-phase motor control system with a voltage-current displacement regulator that is rendered effective when the motor approaches running speed and that is inhibited during the acceleration period.

Another specific object of the invention is to provide a three-phase motor control system with a voltage-current displacement regulator that is rendered effective during running speed and is inhibited under overhauling load conditions.

Another specific object of the invention is to provide an improved power saver three-phase motor control system that reduces the input power when the motor is operating at less than full load.

Another specific object of the invention is to provide an improved power saver three-phase motor control system that detects the load voltage-current displacement and adjusts the input power to the motor only during conditions which are essentially less than rated current driving conditions to avoid the overload region where the load voltage-current displacement decreases with increasing load.

Another specific object of the invention is to provide a power saver three-phase motor control system with improved ripple signal means for stabilizing the reduced voltage point at which the motor is running under load voltage-current displacement feedback control.

Another specific object of the invention is to provide a power saver three-phase motor control system with improved means for adjusting the gain of the integrator to a particular situation.

Other objects and advantages of the invention will hereinafter appear.

BRIEF DESCRIPTION OF THE DRAWINGS

FIG. 1 is a block diagram of a load voltage-current displacement feedback motor control system generally showing the arrangement thereof;

FIG. 5 is a graph of curves showing further operating characteristics of the circuit of FIGS. 2a-c;

FIG. 6 is a graph of curves showing operating characteristics of the 30-degree pulse synthesizer of FIGS. 2c-d that provide pulses for operating the second quadrant detector.

DESCRIPTION OF THE PREFERRED EMBODIMENT

Figure 2A:
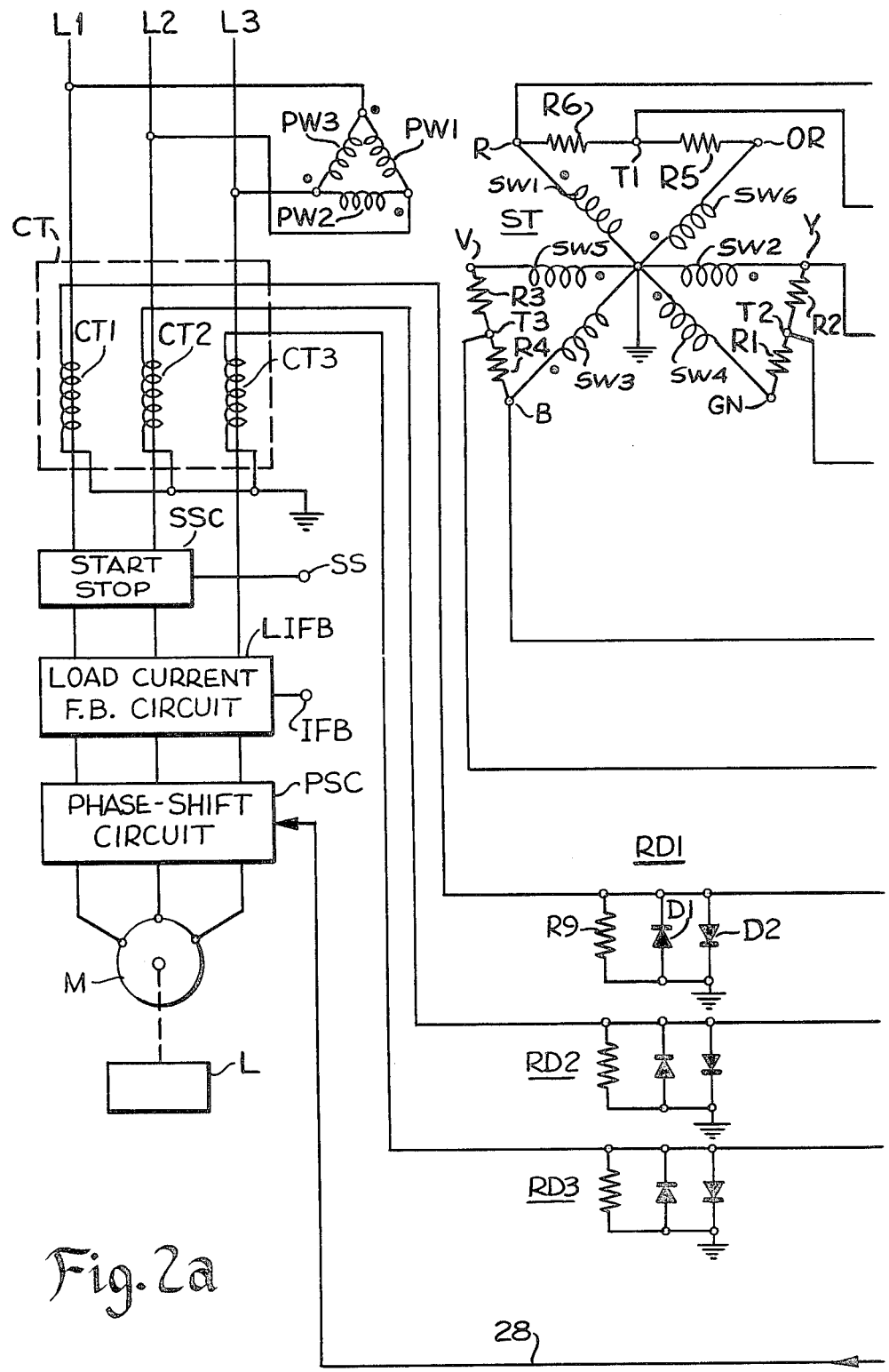
FIGS. 2a-i, when assembled in order from left to right, is a circuit diagram showing details of a current control system with adjustable ramp time and load voltage-current displacement regulator.

Referring to FIG. 1, there is shown a block diagram of the load voltage-current displacement regulator to illustrate the general arrangement thereof. As shown therein, an alternating current power line of the 3-phase type or the like supplies a motor M that runs a load L. The motor is controlled by a phase-shift circuit PSC that is in the power line ahead of the motor. This phase-shift circuit controls the amount of electrical power applied to the motor to control the operation thereof. This is done by controlling the phase or firing angle of thyristors such as triacs or the like to adjust and regulate the amount of power applied to the motor.

A start-stop circuit SSC supplied from the power line may be manually operated to start the motor and to stop the motor.

For motor starting control, a load current feedback signal circuit LIFB detects the magnitude of load current. Both the start-stop circuit and the load current feedback signal circuit control a current control regulator CCR having provision for either adjustable ramp time or adjustable level that, in turn, controls the phase-shift circuit on motor start-up and at certain other times hereinafter described.

A load voltage-current displacement feedback signal circuit VCFB functions as a power saver in that it supplies a signal to circuit CCR which has been reconfigured as a load voltage-current displacement regulator to reduce the input power to the motor whenever the power factor indicates that the motor is running at less than full load. A voltage transformer ST supplies a voltage signal and a current transformer CT supplies a current signal to this circuit VCFB which then detects the displacement $\theta$ therebetween that is indicative of the power factor, cos θ, and supplies a feedback signal to regulator circuit CCR proportional to such power factor. Since the power factor decreases from a typical value ranging from 0.9 to 0.8, whenever the motor runs at full load because of the change in rotor slip, to almost zero when the motor is running with no load, by reducing the input power to the motor, the rotor slip changes in a manner to improve the displacement between voltage and current. In this manner, the motor is provided with enough power to run the load, but is not provided with excessive power to waste.

A gate NG is provided to inhibit the load voltage-current displacement feedback signal under overhauling load conditions, this gate being controlled by a second quadrant detector SQD. This "second quadrant" means an operating condition wherein the motor provides retarding torque when certain type loads become an energy source which accelerates the motor to speeds above synchronous speed synchronous speed being the maximum theoretical speed. Under this condition, the load voltage-current displacement feedback should not be permitted to reduce the input power to the motor because that would allow the load to overhaul the motor even faster with loss of control and in some applications cause damage through excessive speed. For this reason, the second quadrant detector is provided to lock out the load voltage-current feedback by closing the gate in FIG. 1 to reestablish full motor excitation until the motor returns to controlling operation.

Referring to FIGS. 2a-i, there is shown a control system for a 3-phase induction motor M of the squirrel cage type or the like operating a load L. This motor M in FIG. 2a is supplied from a 3-phase electrical power source through power lines L1, L2 and L3, there being a phase-shift circuit PSC in the power lines ahead of the motor for controlling and regulating the amount of power applied to the motor. This phase-shift circuit is preferably of the A.C. thyristor type using Triacs or SCR's or the like whereby the firing point (or angle) of SCR's on the half-cycles of A.C. voltage may be controlled to thereby control the power applied to the motor. That is, when the firing phase-angle is advanced, the applied power is increased because that allows the Triacs or SCR's to conduct over a larger portion of each half-cycle. And when the firing phase-angle is retarded, the applied power is decreased because that limits the A.C. thyristors' conduction to a smaller portion of each half-cycle of applied voltage. Since phase-shift circuits of this type are known in the art, circuit PSC is shown in block diagram form to avoid complicating the drawing.

In order to regulate the power applied to the motor in accordance with change in the motor load, there is also provided means for obtaining a load current feedback signal and for ultimately using this signal to control the aforementioned phase-shift circuit. This means comprises load current feedback circuit LIFB connected to the power lines ahead of the motor. This circuit may comprise a current transformer and rectifier and load current pickup means such as a resistor network or the like to obtain a D.C. voltage signal IFB proportional to the current being drawn by the motor for use in the regulating system hereinafter described. Since load current feedback circuits of this type are known in the art, circuit LIFB is shown in block diagram form in FIG. 2a.

In order to start the motor running and to stop it when desired, there is also provided a start-stop circuit SSC connected to be powered across a pair of the power lines as shown in FIG. 1 for providing a start-stop signal SS that shifts from 0 volts when a stop control is in effect to 15 volts D.C. or the like when a start control is in effect. Since start-stop circuits of this type are known in the art, circuit SSC is shown in block diagram form in FIG. 2a.

In order to provide load voltage-current displacement signals, there are provided three-phase transformers as shown in FIG. 2a including a three-phase voltage transformer ST and a set of current transformers CT.

As shown therein, voltage transformer ST has three delta-connected primary windings PW1, PW2 and PW3 connected at their junctions to the three conductors of the three-phase power line to provide line-to-line voltages that are delayed as hereinafter described. The secondary of transformer ST is provided with three star-connected windings SW1, SW2 and SW3 connected at their junction to common ground and providing at their other terminals R, Y and B signals that will be used to define the voltage zero crossings as hereinafter described for relating to the current zero crossings to determine the phase displacement therebetween. The secondary of transformer ST is also provided with three additional star-connected windings SW4, SW5 and SW6 in phase with windings SW1, SW2 and SW3, respectively. These additional windings are connected at their junction to the common ground and are connected at their other ends GN, V and OR through pairs of phase-dividing resistors R1 and R2, R3 and R4, R5 and R6, to terminals Y, B and R, respectively, of the first star-connected secondary windings. The junctions T1, T2 and T3 between the resistors of the pairs thereof provide six line-to-neutral voltage zero crossing signals and terminals R, Y and B provide six line-to-line voltage zero crossing signals per electrical cycle to provide a 30-degree pulse train for the second quadrant detector SQD hereinafter described. The purpose of this second quadrant detector is to lock out the feedback signal on overhauling load.

The aforementioned line-to-line voltages or voltage pulses will be related to current pulses coming from secondary windings of current transformers CT1, CT2 and CT3 to provide load voltage-current displacement feedback pulses having a variable pulse width as a function of the phase displacement between the voltage and current of the motor, that is, proportional to the power factor of the motor control system. The three current transformer secondary windings whose primaries are the respective power lines L1, L2 and L3, are connected to common ground at one side and at their other side are connected to three circuits hereinafter more fully described to provide the aforementioned current pulses for comparison with the voltage pulses.

Figure 4:
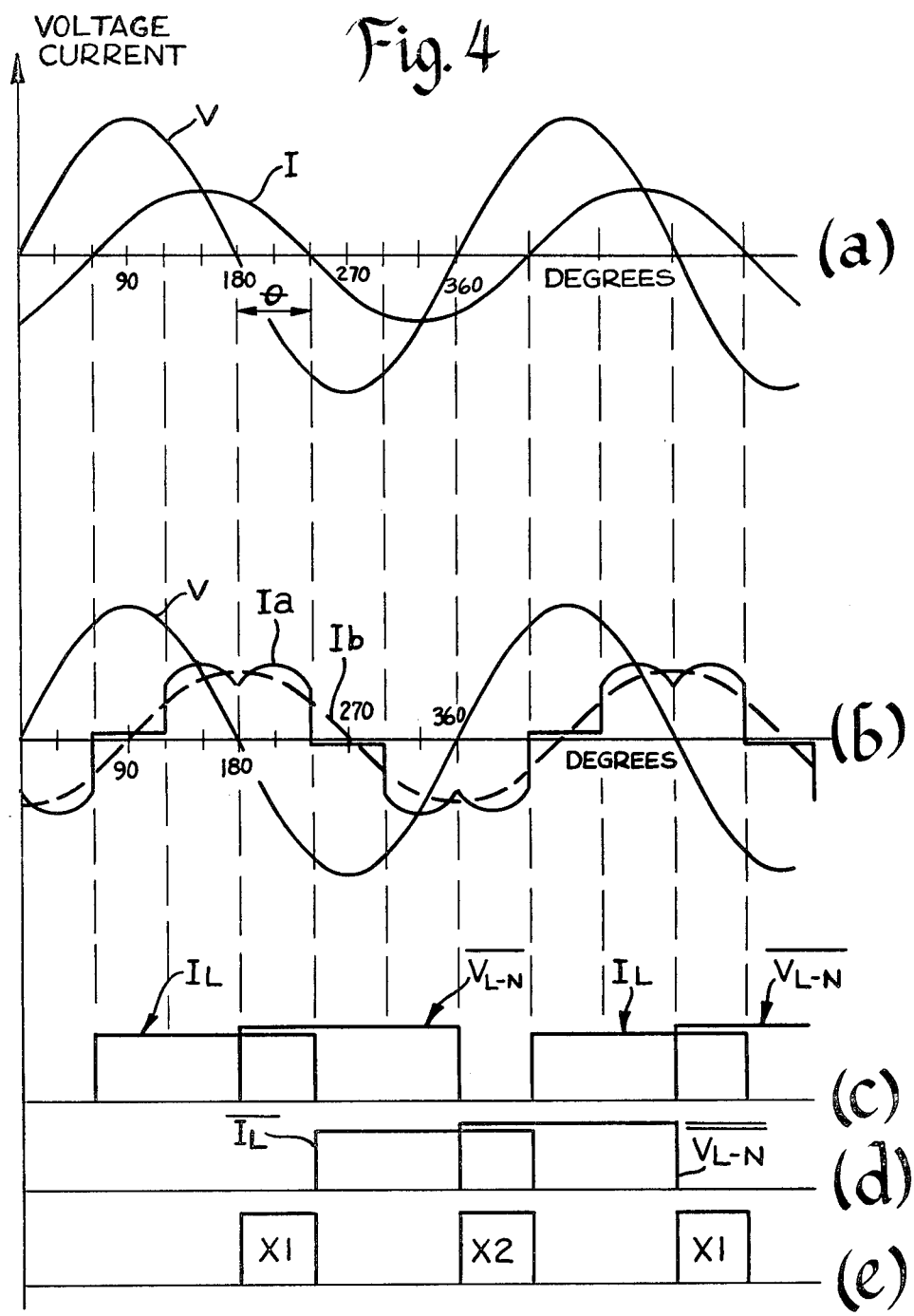
FIG. 4 is a graph of curves showing operating characteristics of the load voltage-current displacement feedback signal circuit of FIGS. 2a-c.

The curves in FIG. 4 show how the load voltage-current phase displacement feedback pulses are produced and these curves will be referred to in connection with the description of the circuit in FIGS. 2a-d. As an example, the relationship between the voltage and current for a given load is shown in FIG. 4a as a function of the angle θ. This angular displacement, indicated as 60 degrees, between the voltage V zero crossing and the current I zero crossing is a true indication of the load's power factor, Cos 60 degrees=0.5, because both wave forms are sine waves. FIG. 4b also shows a voltage V and current Ia the zero crossings of which are displaced by 60 degrees. In this case, however, the true power factor is not 0.5 (Cos 60°) because of the none-sine wave shape of the current wave. A fourier analysis of the current waveform would indicate a fundamental sine wave Ib associated with current wave Ia that is displaced by 90 degrees from the voltage zero crossing. The true power factor for the voltage and current waveforms shown in FIG. 4b would be Cos 90 degrees. The load voltage-current phase displacement circuit of FIGS. 2a–i produces a signal that is proportional to the displacement between the voltage zero crossing and the subsequent current zero crossing. Therefore, for FIG. 4a, the feedback pulse produced as hereinafter described would be 60 degrees wide and the same would be true for FIG. 4b. Actually, for the simple single phase conditions illustrated in FIG. 4a, there would be two pulses per cycle, one for the voltage and current zero crossing from positive to negative and another for the voltage and current zero crossing from negative to positive.

The circuit shown in FIG. 2a–d comprises means for producing pulses having a width proportional to the load voltage-current phase displacement. As shown therein, voltage waves from terminals R, Y and B of the secondary winding of transformer ST are applied through phase-shift networks RC1, RC2 and RC3 to the inverting inputs of operational amplifiers OP1 and OP2 and the non-inverting input of operational amplifier OP3, respectively, the other non inverting inputs and inverting input of which are connected to ground. Each such phase-shift network comprises a series resistor R7 and a resistor R8 in parallel with a capacitor C1 to ground. These phase-shift networks delay the line-to-line voltages approximately 28 electrical degrees in order to enhance the drive's response to load changes. Thus, this 28 degree delay provides a voltage transition that occurs 2 degrees earlier than the corresponding line-to-neutral zero crossing would actually generate. As a result, for a particular load voltage current displacement, the feedback pulse generated is wider than the actual displacement between voltage and current to maximize the response to load changes as hereinafter more fully described.

Referring to FIG. 5, it will be apparent that during the positive half-cycle of voltage at transformer terminal R the output of amplifier OP1 will be a negative square wave whereas during the negative half-cycle of transformer voltage the output of amplifier OP1 will be a positive square wave because the transformer voltage is connected to the inverting input of the amplifier. A similarly inverted square wave appears at the output of amplifier OP2 with respect to the voltage at transformer terminal Y. However, the voltage at transformer terminal B is applied to the non-inverting input of amplifier OP3 so that the output of the latter is a positive square wave for a positive half-cycle at terminal B and a negative square wave for a negative half-cycle of voltage at terminal B. But the inversion of this square wave takes place later at NOR gate NG1 in FIG. 2c, this being a 2-input NOR gate used as an inverter, so that the pulses on conductors 1, 2 and 3 are square wave pulses inverted in phase with respect to the line-to-line voltages delayed 28 degrees or, in other words, inverted square wave line-to neutral voltages advanced 2 degrees as generally shown by curves b, c and d in FIG. 5.

Since conductors 1, 2 and 3 now have 180 degree square wave pulses with predetermined zero crossing points, what is left is to provide current pulses with defined zero crossing points for comparison therewith to afford load voltage-current displacement proportional pulses for motor control. The current waves from current transformer secondary windings CT1, CT2 and CT3 are applied to the non-inverting inputs of operational amplifiers OP4, OP5 and OP6 that have their inverting inputs connected to ground. Resistor-diode networks RD1, RD2 and RD3 are connnected from the non-inverting inputs of amplifiers OP4–6, respectively, to ground to limit the positive and negative values of the current waves applied to these operational amplifiers, each of these networks having a resistor R9 connected in parallel with reverse-parallel diodes D1 and D2 between the amplifier input and ground.

Figure 2B:
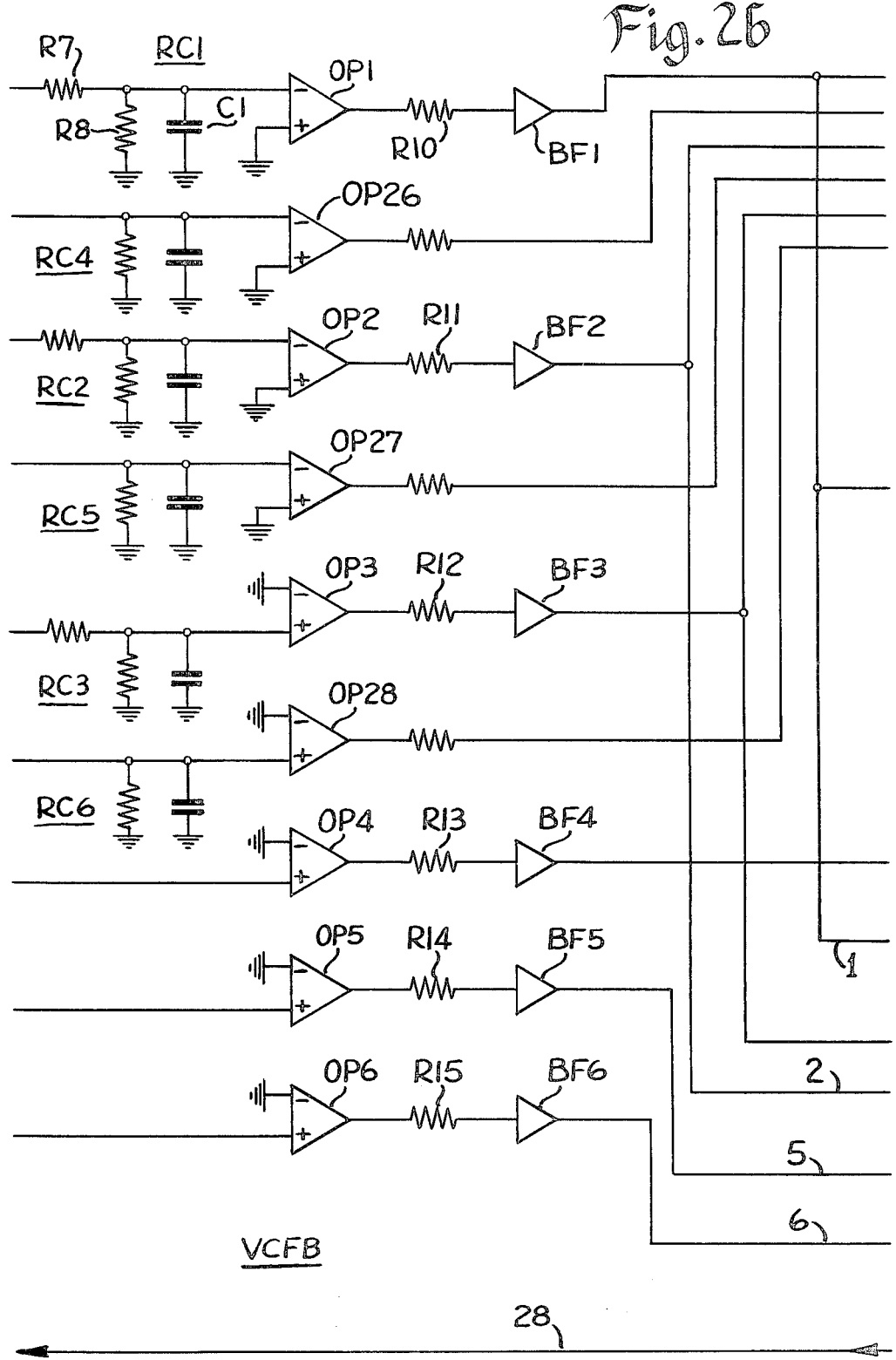
Figure 2C:
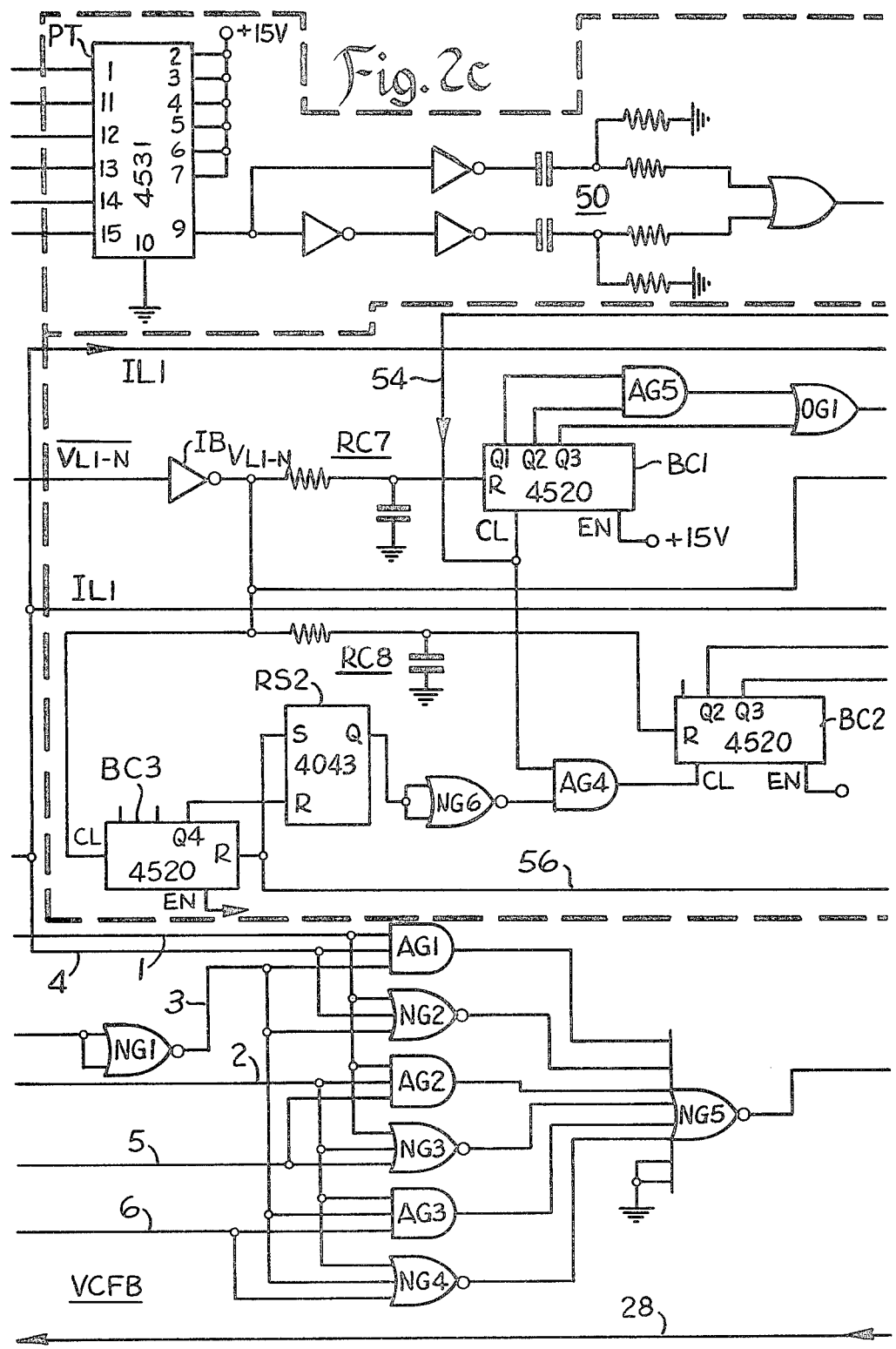

The three voltage pulses from amplifiers OP1–3 and the three current pulses from amplifiers OP4–6 are applied through respective resistors such as R10–R15 and non-inverting buffers such as BF1–BF6 and then through conductors 1–6 to a logic circuit that develops feedback pulses having a width proportional to the load voltage-current phase displacement, or proportional to the load power factor, for feedback use in improving the displacement between voltage and current under variable load in order to save power. This logic circuit comprises three AND gates AG1–3, three NOR gates NG2–4, and NOR gate NG5 as shown in FIG. 2c.

The manner in which these feedback pulses are developed is shown by the curves in FIG. 4, assuming that the voltage wave therein represents one of the three-phase line-to-neutral voltages and the current wave therein represents the corresponding line current. In view of the aforementioned inversion of the line voltage half-cycles by amplifiers OP1 and OP2 and NOR gate NG1, the buffered voltage pulses on conductors 1–3 are logically NOT $V_{L-N}$ or $\overline{V_{L-N}}$ while the line current half-cycles and the buffered line current pulses are in phase, respectively, and therefore logically $I_L$ as shown for one of the lines in FIG. 4c. The logic equation necessary to produce pulse $X_1$ in FIG. 4e is:

$$X_1 = \overline{V_{L-N}} \cdot I_L$$

or, in other words, $X_1$ is equal to NOT $V_{L-N}$ and $I_L$. It will be apparent that this logic equation is satisfied only during the phase displacement $\theta$ between the zero crossings to negative of the voltage and current waves in FIG. 4a so that the width of pulse $X_1$ is proportional to the power factor, Cos $\theta$. Thus, combining a buffered voltage signal ($\overline{V_{L-N}}$) with that line's buffered current signal ($I_L$) via an AND gate will produce a first pulse $X_1$ when the voltage and current are crossing from positive to negative whose width is proportional to the displacement between the voltage and current crossings.

Now, when the voltage and current are crossing zero from negative to positive, a logic element suitable for providing pulse $X_2$ in FIG. 4e must satisfy the equation:

$$X_2 = \overline{\overline{V_{L-N}} \cdot \overline{I_L}} = \overline{\overline{V_{L-N}} + \overline{I_L}}$$

This is exactly what one gets if $\overline{V_{L-N}}$ and $\overline{I_L}$ are combined in a logic NOR gate where $\overline{A+B}=C$ or $\overline{A} \cdot \overline{B}=C$, whereby:

$$X_2 = \overline{\overline{V_{L-N}} \cdot \overline{I_L}}$$

as shown in FIG. 4d. Thus, given the polarities of the buffered voltage and current signals with respect to the actual line-to-neutral voltage (as modified) and line current, a NOR gate will produce a second pulse whose width is proportional to the displacement between the voltage and current zero crossings when the voltage and current are going from negative to positive.

To summarize the above, an AND gate will produce a pulse when the voltage and current cross from positive to negative and a NOR gate will produce a pulse when such voltage and current cross from negative back to positive on each cycle of one phase of the 3-phase line. Therefore, the three AND gates AG1–3 and three NOR gates NG2–4 connected to the respective voltage and current pulses as shown in FIG. 2b–c, will produce two pulses on each cycle of each phase of the three-phase line for a total of six pulses per three-phase cycle. These pulses are summed in NOR gate NG5. The width of these pulses is proportional to the displacement between voltage and current of the load so that they can be used as feedback pulses to control the motor's excitation for improved load voltage-current displacement and consequent power saving.

More specifically, as shown in FIG. 2b–c, the voltage signal on conductor 1 and the corresponding current signal on conductor 4 are input to AND gate AG1 and NOR gate NG2. In a similar manner, voltage and corresponding current signals on conductors 2 and 5 are input to AND gate AG2 and NOR gate NG3. And the voltage and current signals on conductors 3 and 6 are input to AND and NOR gates AG3 and NG4.

However, these AND and NOR gates have three inputs, the purpose of the third input being to limit the pulse width to 60 degrees because that is the maximum usable pulse width since any width greater than 60 degrees would only provide overlapping pulses. Thus, output NG5 would not increase in output as is apparent from the illustration of the windows A–F in FIG. 5a provided by the logic in FIG. 2c as follows:

A = window of AG1
B = window of NG4
C = window of AG2
D = window of NG2
E = window of AG3
F = window of NG3

The manner in which the third input to AND gate AG1, for example, performs this limiting function is illustrated by the curves in FIGS. 4 and 5. The 60 degrees displacement of line L1-N voltage and current as determined by the inverted and buffered voltage and current pulses on conductors 1 and 4 occurs between 180 and 240 degrees in FIG. 4a. These two pulses are applied to two inputs of AND gate AG1 to produce pulse X1 shown in FIG. 4e. The buffered and inverted voltage of line L3-N is applied from conductor 3 to the third input of AND gate AG1. Referring to FIG. 5d, it will be apparent that the line L3-N pulse is a square pulse inverted with respect to sine wave L3-N which is positive during period A and crosses to negative at 240 degrees which is the end of period A. This transition to negative turns off AND gate AG1 to limit the width of pulse X1 to 60 degrees.

In a similar manner, a third input is applied from conductor 3 to NOR logic NG2 to turn it off at the end of the 60 degree displacement period. However, in this case, the L3-N pulse transition is from negative to positive as shown by the square wave in FIG. 5d, this curved depicting the signal on conductor 3 in FIG. 2c.

The remaining AND gates AG2 and AG3 and NOR gates NG3 and NG4 are each similarly provided with two inputs to develop the power factor pulses and a third input appropriately connected to limit the width of the power factor pulses to a maximum of 60 degrees.

The positive pulses from the outputs of AND gates AG1-3 and NOR gates NG2-4 are inverted in an 8-input NOR gate NG5 and applied to one of the two inputs of a switching NOR gate NG, the other input of which is used to lock out these load voltage-current displacement feedback pulses under overhauling load conditions by the circuit hereinafter described.

This circuit for locking out the load voltage-current phase displacement feedback signal comprises a second quadrant detector SQD and a 30 degree clock synthesizer CS. The essential function of the second quadrant detector is to detect if the motor is being overhauled by the load and, if so, to lock out the power factor signal at NOR gate NG until motor operation returns to the motoring quadrant. An example of an overhauling load condition is a crane or hoist where lowering a heavy load turns the motor faster than synchronous speed, as compared to a need for motoring at less than synchronous speed to overcome friction and windage in driving down an empty hook, against an opposing, hoist direction motor torque. It is, of course, desirable to lock out the load voltage-current displacement feedback under this condition because, otherwise, to reduce the power to the motor would allow the load to overhaul the motor even faster, possibly creating dangerous conditions. Therefore, the system has been provided with the second quadrant detector which applies a "high" to the other input to NOR gate NG to inhibit the output pulses X1, X2, etc., coming from NOR gate NG5 from passing therethrough until the motor regains control of the load. The clock synthesizer provides clock pulses spaced 30 degrees apart for operating the second quadrant detector as hereinafter described.

Assuming first that the second quadrant detector is not in lock-out state, it applies a gating "low" to the second input of NOR gate NG to allow the power factor pulses to pass therethrough and to be inverted from "low" to "high". These pulses are buffered in non-inverting buffer BF7, which may represent a plurality of like buffers in parallel, and applied through conductor 8 to the motor regulating system shown in FIGS. 2e–i.

Figure 2D:
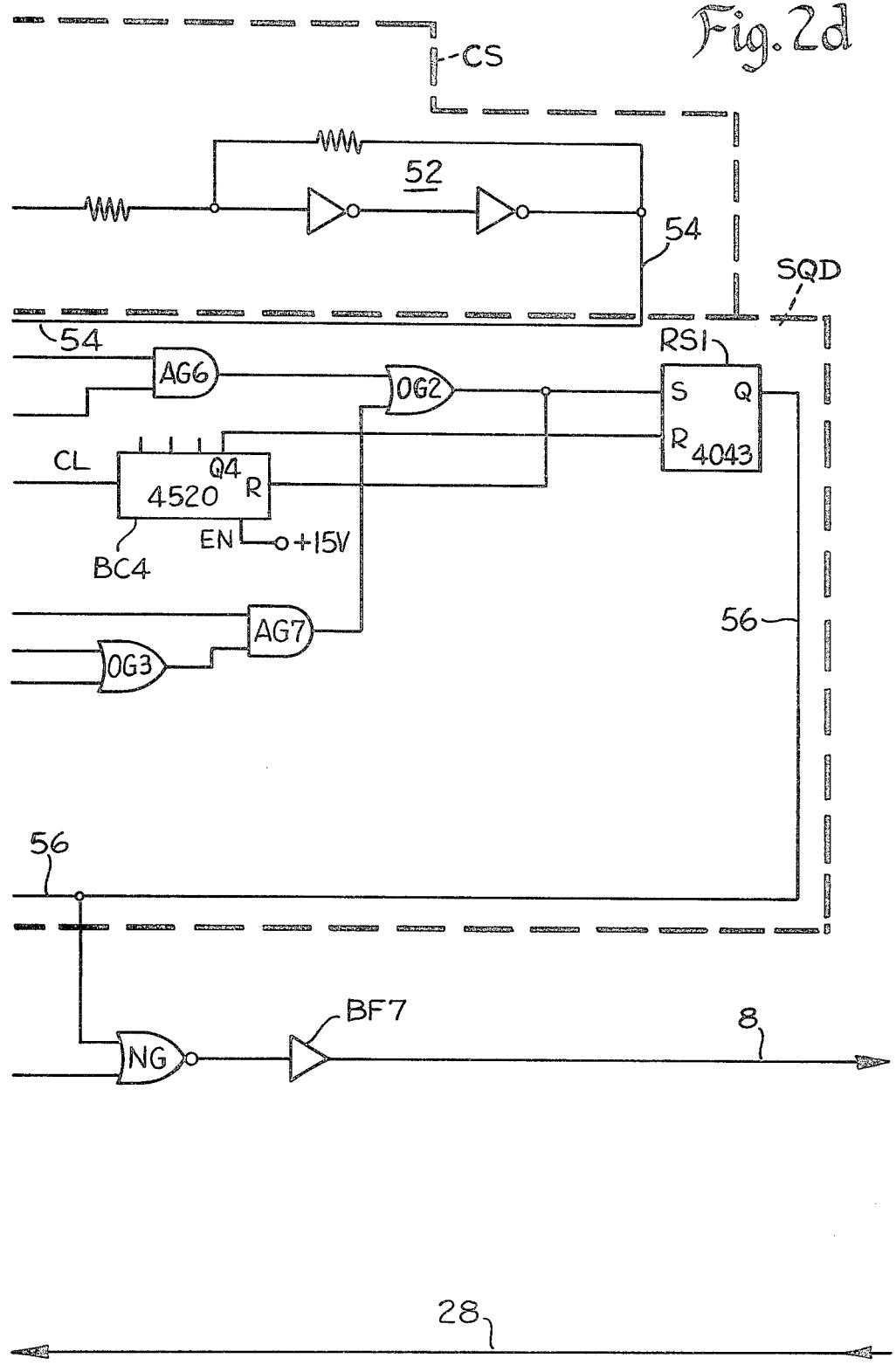
Figure 2E:
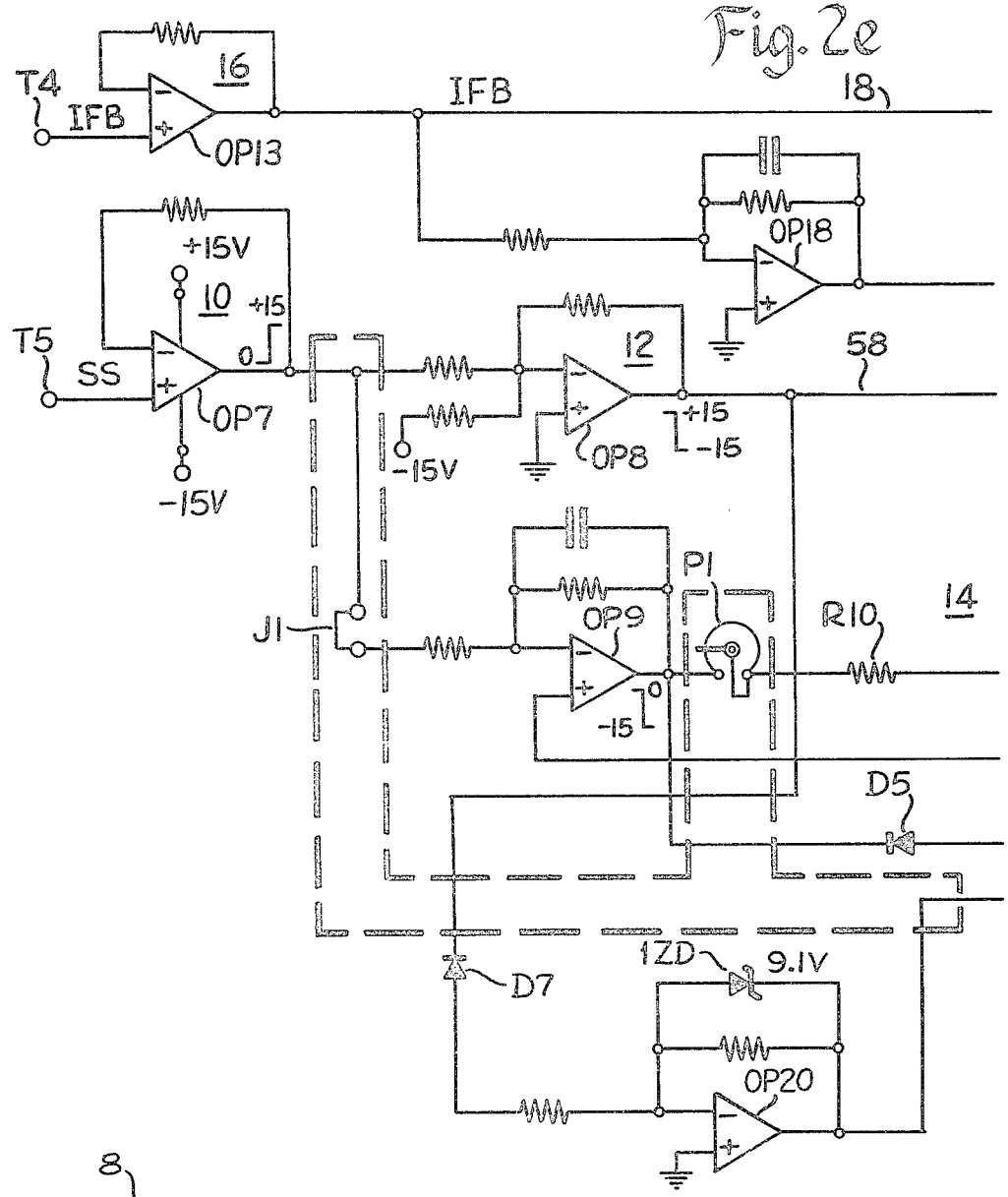

Referring now to FIGS. 2a and 2e, it will be apparent that a load current feedback signal IFB is applied from the output terminal of load current feedback circuit LIFB in FIG. 2a to terminal T4 in FIG. 2e. Also, a start-stop signal SS is applied from start-stop circuit SSC in FIG. 2a to terminal T5 in FIG. 2e. In addition, the aforementioned load voltage-current displacement feedback signal is applied from conductor 8 in FIG. 2d to the continuation of conductor 8 in FIG. 2e.

This start-stop signal SS that is 0 volts at stop condition and +15 volts at start condition is applied to the non-inverting input of a buffer circuit 10 that includes operational amplifier OP7. The 0 volts input causes a 0 volts output and the +15 volts input causes a +15 volts output from amplifier OP7. This buffer circuit 10 has a high input impedance so that it doesn't load down the circuit from which it receives its input signal, and has a low output impedance, good current drive, so that it can effectively drive the following circuits as required.

When the operator actuates the start control, the +15 volts input to this buffer 10 causes its output to shift from 0 volts to +15 volts and this is applied to the inverting input of an amplifier circuit 12 that includes operational amplifier OP8, causing the output of the latter to shift from +15 volts to −15 volts. The manner in which this output is used will become apparent presently.

The circuit directly below amplifier 12 that includes operational amplifiers OP9 and OP10 is a ramp signal generator circuit 14 with the slope of the signal ramp being adjustable by potentiometer P1. Under stop condition, when the output of amplifier OP8 is +15 volts, capacitor C3 discharges to −0.6 volts, which is the voltage drop across diode D3, and is clamped at that voltage level by diode D3. Under start condition, when the output of amplifier OP8 is −15 volts, diode D4 is reverse-biased so that the ramp generator circuit is free to operate. For this purpose, amplifier OP9 is a high gain amplifier and at start condition, +15 volts is applied from the output of amplifier OP7 to its inverting input, thus causing its output to go to −15 volts. As a result, capacitor C3 charges at a ramp rate, determined by the values of resistor R10 and potentiometer P1 setting, to a predetermined level and stops there due to the feedback connection from the output of amplifier OP10 to the non-inverting input of amplifier OP9. This feedback, regulating loop keeps the voltage on capacitor C3 at exactly the value of the voltage at jumper J1 which has been stated to be +15 volts. This ramp signal provides one type of desirable starting characteristic for the motor. If the circuit shown in FIG. 3 were substituted for the broken line enclosed portion of FIG. 2e, the current feedback would have an adjustable level and fixed ramp rather than an adjustable ramp and fixed level. Both the adjustable ramp and adjustable level type current feedback regulators are broadly known in the art but are described briefly herein to show how the load voltage-current displacement feedback apparatus is incorporated therein.

During the aforementioned starting period when the ramp sighal is being generated, −15 volts is applied from the output of amplifier OP9 through diode D5 to input resistor R11 to hold the output of summing operational amplifier OP11 at a positive voltage. This inhibit voltage is maintained for the entire starting ramp period until capacitor C3 reaches +15 volts and keeps the load voltage-current feedback signal turned off. At the end of this starting period, when the feedback voltage of the ramp generator on the non-inverting input of amplifier OP9 equals the +15 volts on the inverting input thereof, the output of amplifier OP9 goes to 0 volts which terminates the inhibit signal through diode D5.

The voltage at the output of amplifier OP10 of the ramp generator is a current limit reference signal that is applied through analog switch AS1 and summing amplifier OP12. This current limit reference is then summed with a current feedback signal coming from terminal T4 in FIG. 2e through a buffer 16 that includes operational amplifier OP13, conductor 18 and analog switch AS2 in a summing circuit 20 that includes operational amplifier OP14. The output of the latter is then applied through a response adjustment circuit 22 and an integrator circuit 24 that includes operational amplifier OP15 to a summing circuit 26 that includes operational amplifier OP16 and to phase-shift input conductor 28 through terminal T6. The aforementioned output of amplifier OP14 is also applied through a gain-adjustment proportional circuit 30 that includes operational amplifier OP17 to summing circuit 26.

These current limit reference and current feedback signals regulate the motor during starting. When the motor approaches its up-to-speed condition, the load voltage-current displacement feedback and reference are susbstituted for the two current control signals. This is done by turning analog switch AS3 on and at the same time turning analog switches AS1 and AS2 off.

The circuit operation for substituting load voltage-current displacement feedback and reference for current limit reference and feedback control will now be described. This description will show how this system has the ability to switch from across the line operation (600 percent current limit), the ultimate end of either the current ramp or current level starting characteristics, to a load voltage-current displacement regulator.

As hereinbefore mentioned, a load current feedback signal comes in at terminal T4 in FIG. 2e and is applied to the non-inverting input of operational amplifier OP13 in buffer 16. The output of this buffer drives the several circuits hereinafter described.

Assuming that the motor's shaft speed is approaching synchronous speed, the motor begins to generate a counter-voltage which is the force that causes a reduction of its accelerating current from the accelerating level to the running level. A voltage that is proportional to motor current is applied to buffer 16. This signal is inverted and filtered by operational amplifier OP18 that has a gain of minus one. Its output which is a negative voltage is algebraically summed with a reference of, for example, +2.88 volts in a summer circuit 32 which includes operational amplifier 0P11.

The load current feedback voltage is, for example, −12 volts at 600 percent accelerating current and −2 volts at rated or 100 percent current. Therefore, when the motor current decreases to 114 percent, the signal from amplifier OP18 will be −2.28 volts.

The circuit connected to the output of summer 32 is a Schmitt trigger circuit 34 having an operational amplifier OP19. During the preceding accelerating period, the output of this Schmitt trigger circuit has been at −15 volts. Consequently, the voltage on the non-inverting input of its amplifier is −0.6 volts, which is equal to the voltage drop across diode D6. Now, when the output of summer amplifier OP11 to the inverting input of Schmitt trigger amplifier OP19 goes slightly more negative than −0.6 volts, the output of the latter switches from −15 volts to +15 volts. This occurs as follows.

The aforementioned reference voltage of +2.88 volts on the inverting input of summer amplifier OP11 is obtained as follows. It will be recalled that the start signal caused the output of amplifier OP8 to switch from +15 volts to −15 volts. This −15 volts is applied to the inverting input of operational amplifier OP20 through diode D7. Resistors R12 and R13 between the output of amplifier OP20 and the inverting input of summer amplifier OP11 and zener diode ZD are given values such as to provide a reference voltage of +2.88 volts for comparison with the current feedback signal coming to resistor R14. When this current feedback signal falls slightly below the aforementioned −2.28 volts so that when summed with the +2.88 volt reference, the slightly more than +0.6 volt input causes the output of amplifier OP11 to go slightly more negative than −0.6 volts, the output of Schmitt trigger amplifier OP19 switches to +15 volts which is an up-to-speed signal. This up-to-speed signal is processed as hereinafter described and used to switch the regulator from current control to load voltage-current displacement control.

The Schmitt trigger circuit 34 is provided with a feedback circuit to prevent resetting it at this time by large currents should they occur. For this purpose, a voltage divider comprising resistor R15 and potentiometer P2 is connected from the output of amplifier OP19 to ground with the junction therebetween applying +10 volts or the like to the non-inverting input of amplifier OP19. This requires that a potential greater than +10 volts must be applied to the inverting input to reset the Schmitt trigger circuit.

Figure 2F:
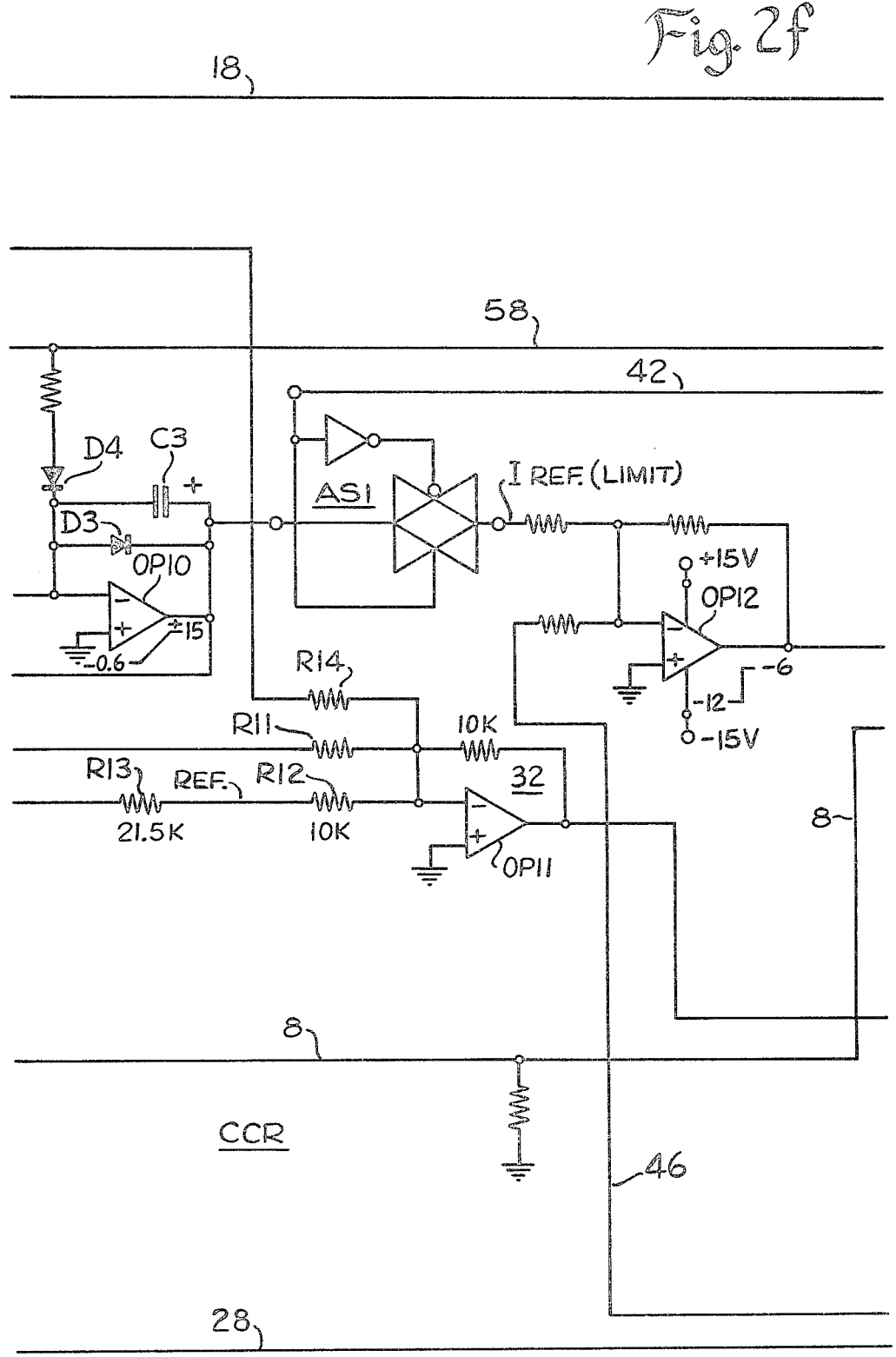
Figure 2G:
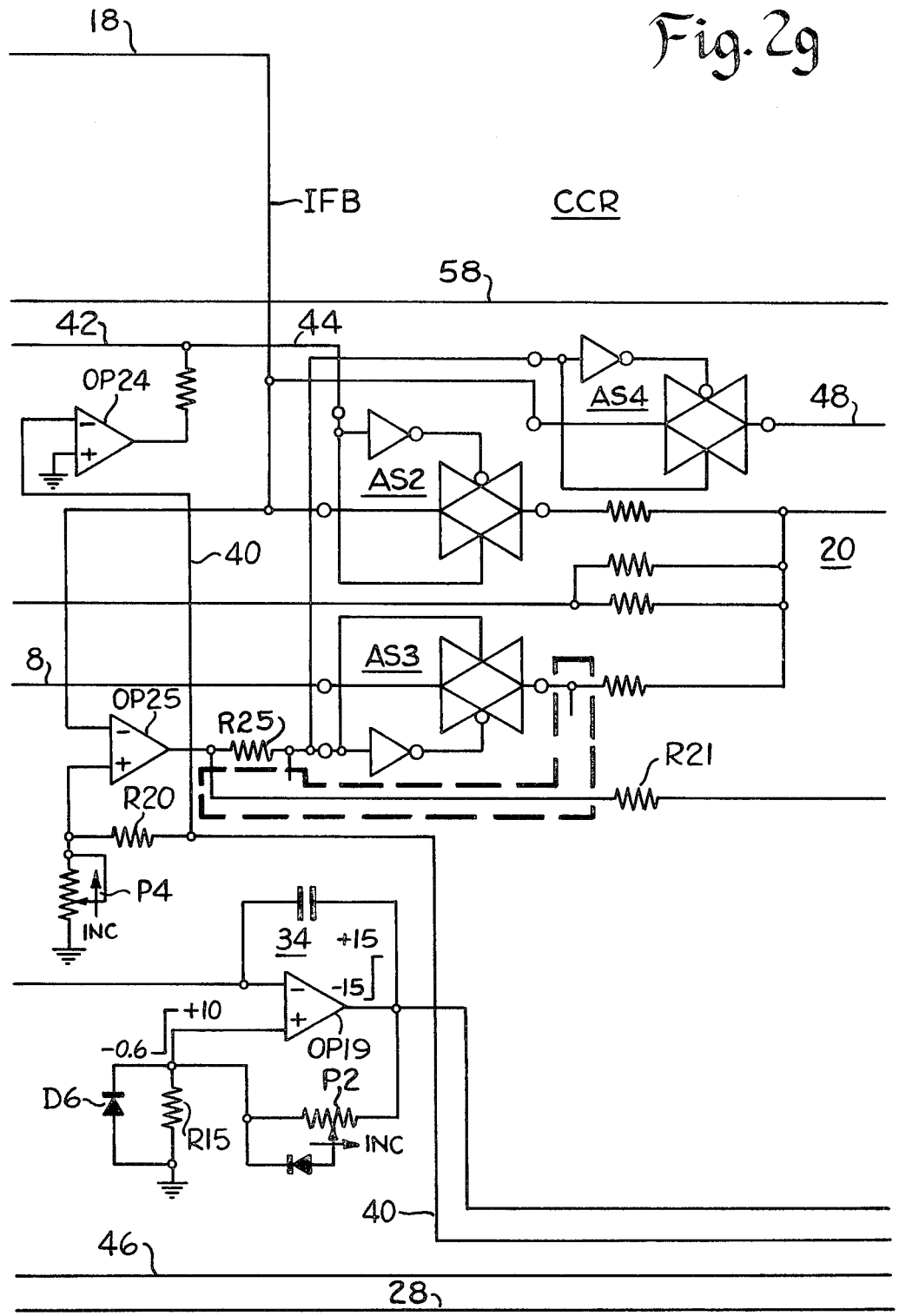
Figure 2H:
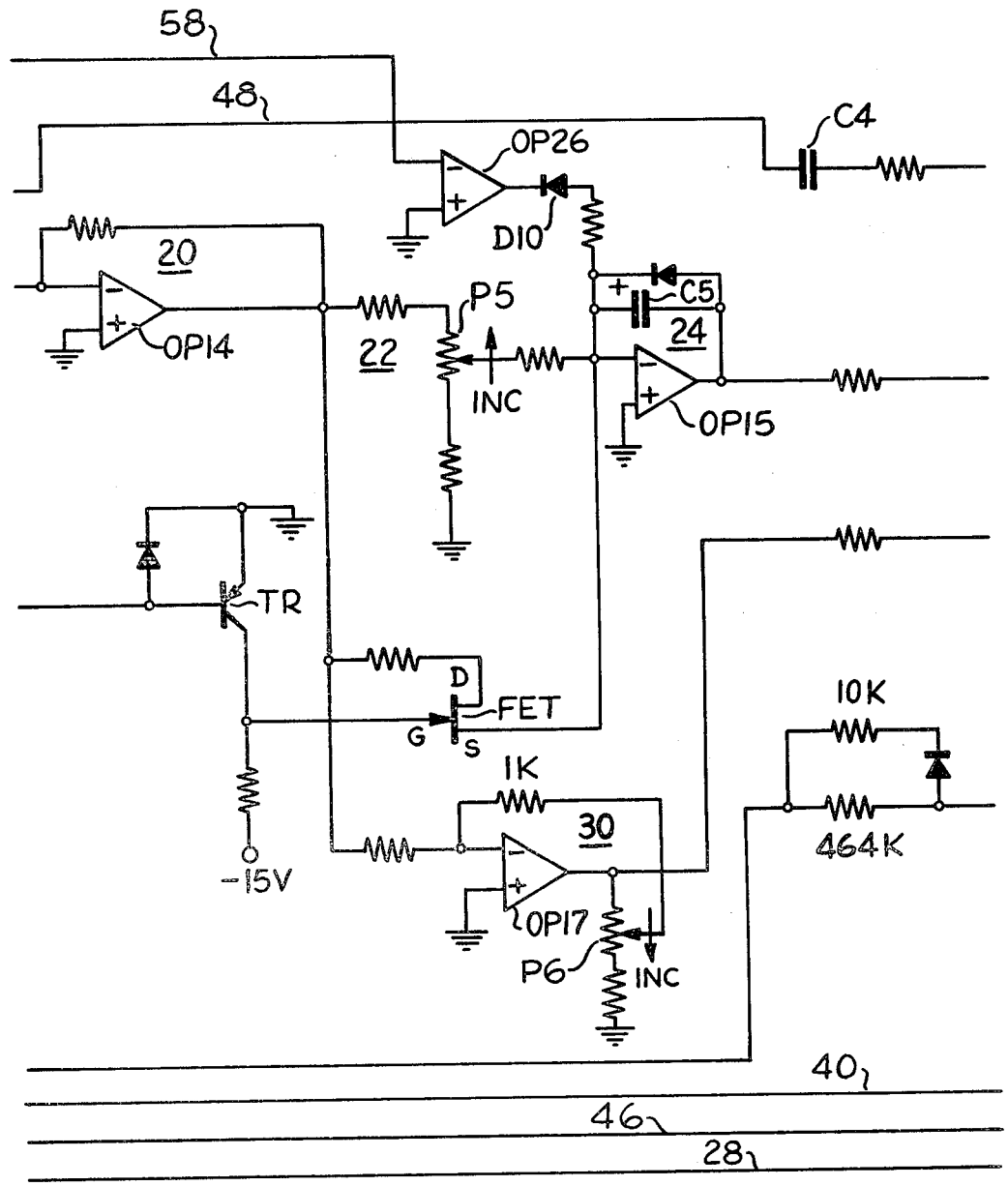
Figure 2I:
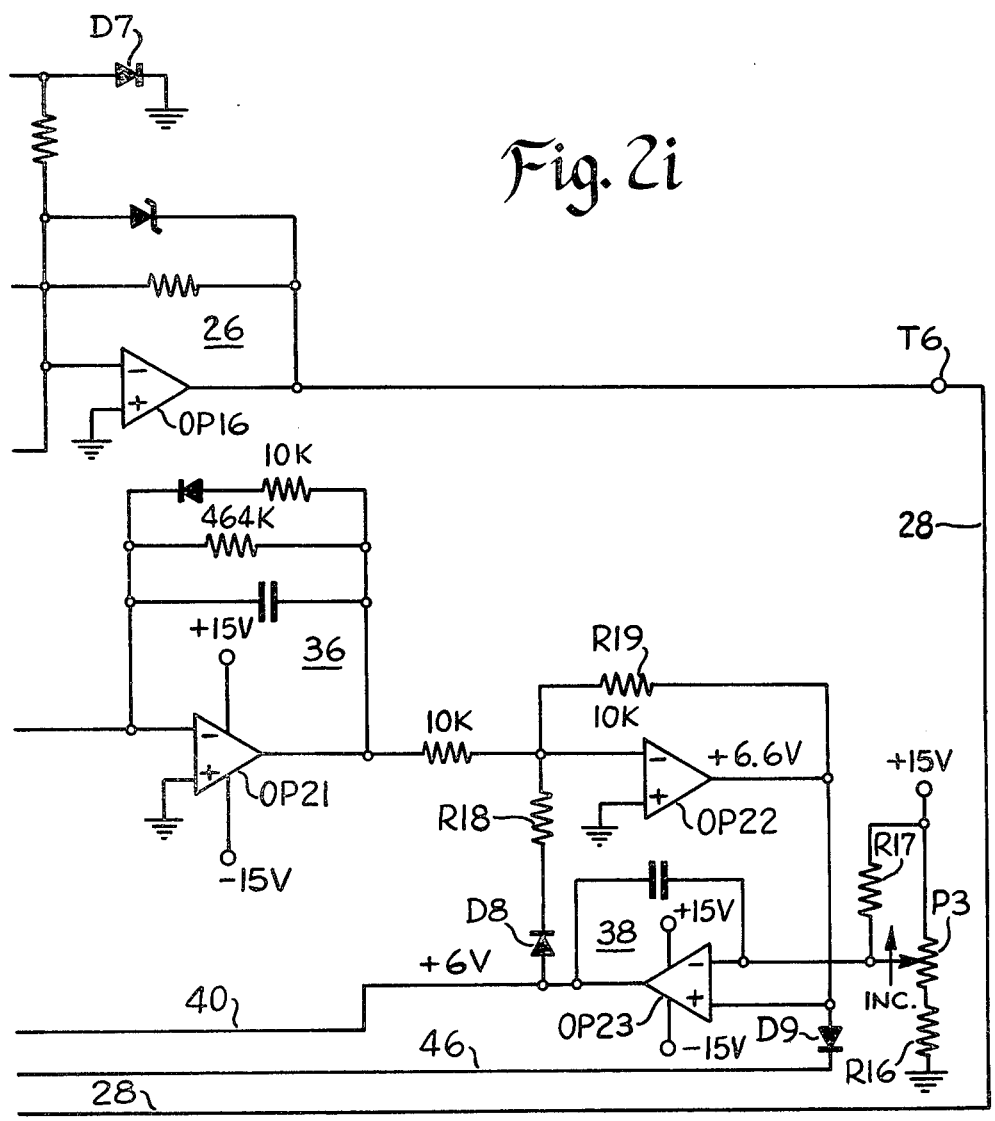

This up-to-speed signal is applied from the Schmitt trigger circuit to an inverting and delay circuit 36 in FIG. 2i that includes operational amplifier OP21, the maximum delay being on the signal, that is, the output voltage of amplifier OP21, going negative. This inverting and delay circuit 36 is a long time filter with a gain of one.

This delayed signal is fed to operational amplifier OP22 which inverts the signal and delivers it to operational amplifier OP23 where it will become a load voltage-current displacement reference as hereinafter described.

The aforementioned delayed up-to-speed signal begins at −15 volts and takes, for example, 24 ms to reach 0 volts and then an additional 5 sec. to reach +15 volts. However, the output of amplifier OP22 never reaches +15 volts because it is clamped by clamping circuit 38 that includes operational amplifier OP23 in the following manner.

The voltage divider comprising potentiometer P3 and resistors R16 and R17 is used to apply an adjustable voltage to the inverting input of amplifier OP23 in order to set the level at which the output of amplifier OP22 is clamped. For exemplary purposes, it may be assumed that this voltage divider is set so that the output of amplifier OP23 switches from −15 volts to some positive voltage, the exact magnitude of which will depend on the drive necessary to clamp the output of amplifier OP22 to 6.6 volts (value set on the inverting input of amplifier OP23), for example. A nominal value for the output of amplifier OP23 would be 6 volts.

The clamping action is accomplished by current flow from the output of amplifier OP23 through diode D5 and resistor R18. Thus, when the output of amplifier OP21 goes negative, the output of amplifier OP22 goes positive and is applied to the non-inverting input of amplifier OP23. When this positive voltage exceeds the voltage at the inverting input of amplifier OP23 applied from the voltage divider, the output of amplifier OP23 goes positive. Amplifier OP22 has a gain of one and its output would tend to go to 12 volts. However, some of the current that would otherwise flow through resistor R19 to cause the output of amplifier OP22 to go to 12 volts is now supplied through diode D8 and resistor R18 to clamp the output of amplifier OP22 at 6.6 volts, for example. The voltage divider potentiometer P3 is used to adjust the level at which amplifier OP22's output will be regulated to.

Now, the positive voltage at the output of amplifier OP23 is used to switch off the aforementioned current reference and current feedback signals and to concurrently switch on the load voltage-current displacement feedback signal. For this purpose, the output of amplifier OP23 is applied through conductor 40 to FIG. 2g where it is applied to the inverting input of operational amplifier OP24, causing the output of this high gain amplifier to go to −15 volts. This extremely negative signal is applied through conductor 42 to FIG. 2f where it turns off analog switch AS1, and is applied through conductor 44 to turn off analog switch AS2. Analog switch AS1 turns off the current reference signal and analog switch AS2 turns off the current feedback signal that were being used to regulate the motor's current during the starting intervals.

The aforementioned output of amplifier OP22, clamped at +6.6 volts or the like, is applied from FIG. 2i through diode D9 and conductor 46 to FIG. 2f where it is applied to the inverting input of amplifier OP12 where it will become a load voltage-current displacement reference.

Turning off analog switch AS1 as aforesaid removes the current reference (limit) from the inverting input of amplifier OP12. As a result, the output of this amplifier shifts from a negative value of −12 volts to a nominal −6 volts that is the desired load voltage-current displacement reference. This change in reference is desired because the load voltage-current displacement feedback is essentially a slip regulation rather than current regulation as was used on start-up.

Turning analog switch AS2 off as aforesaid removes the current feedback signal from amplifier OP14. This amplifier and the circuit following it had been operating as an integral and proportional current regulator. With the current reference (limit) and current feedback signals removed and load voltage-current displacement reference and feedback signals applied, this circuit will become a load voltage-current displacement regulator. The load voltage-current displacement feedback signal is switched in by analog switch AS3. For this purpose, the positive voltage on conductor 40 is also applied in FIG. 2g to the non-inverting input of operational amplifier OP25 to establish a level at which the current feedback signal enables the load voltage-current displacement feedback signal. This level is established by the magnitude of the aforementioned clamped voltage at the output of amplifier OP23 in FIG. 2i that appears on conductor 40 in FIG. 2g and also the value of resistor R20 and potentiometer P4, the latter being used to adjust this level. As will be apparent, resistor R20 and potentiometer P4 form an adjustable voltage divider for applying an adjustable voltage from conductor 40 to the non-inverting input of amplifier OP25 in FIG. 2g. The current feedback signal voltage on conductor 18 is applied to the inverting input of amplifier OP25.

Under these conditions, when the current feedback signal falls below 1.8 volts nominal, 90 percent rated current, as the motor approaches synchronous speed as aforementioned, the output of amplifier OP25 switches to a positive saturated level at +15 volts which turns on analog switch AS3. This analog switch connects the load voltage-current displacement feedback signal coming in on conductor 8 to the input of summing amplifier circuit 20 in place of the aforementioned current feedback signal that was switched off.

It will be recalled that the load voltage-current displacement reference signal at the output of amplifier OP12 in FIG. 2f is −6 volts. With this polarity, the output of amplifier OP16 in FIG. 2i is at +12 volts, a condition that has existed since the up-to-speed signal was initiated by the switching action of Schmitt trigger circuit 34. Therefore, the transition from a current regulator to a load voltage-current displacement regulator can be made with no significant change at the output of the regulator.

This system is provided with concurrently operable integral and proportional control at the output of summing amplifier OP14 in FIG. 2h, the integral control having alternative high gain and low gain circuits. As shown in FIG. 2h, the output of summing amplifier OP14 is applied through a resistor and field effect transistor FET to integrator 24. The gate of this FET is controlled by a P-N-P transistor TR that is normally turned on during start-up and acceleration of the motor thereby to keep the FET turned on. As a result, this FET provides a high gain to the integrator for current limit control when starting and accelerating the motor.

When the load voltage-current displacement feedback is switched on as the motor approaches synchronous speed, switching amplifier OP25 also applies +15 volts to the base of transistor TR to turn it off. As a result, the −15 volts pulls the gate of the FET down to turn the latter off. This in effect substitutes the higher resistance low adjustable gain circuit through potentiometer P5 between the output of summing amplifier OP14 and the integrator 24. This provides a slow integrator for stability because this is overall a very high gain system.

For proportional control, the output of summing amplifier OP14 is applied through amplifier OP17 to output summing amplifier OP16, the gain of this proportional control amplifier being adjustable at potentiometer P6. Thus, the current regulation gains of the integral and proportional control circuits are individually adjustable at potentiometers P4 and P5.

Having converted the current regulator to a load voltage-current displacement regulator, the system will respond to the width of the feedback pulses on conductor 8 and the consequent phase-shift input at terminal T6 that is applied through conductor 28 to phase-shift circuit PSC to reduce the excitation to the motor until the desired displacement exists between the line-to-neutral zero voltage crossing and its associated zero current crossing.

The system is also provided with means for stabilizing the reduced voltage point at which the motor is running under load voltage-current displacement feedback control. Due to reasons such as system gain changes, A.C. harmonics or the like, an A.C. motor does not operate with the desired stability at all reduced voltage points. To improve the operation, means is provided to cause the feedback voltage and the firing angle to dither which will stabilize the operation at such point. For this purpose, analog switch AS4 in FIG. 4g is turned on by amplifier OP25 at the same time as it applies the load voltage-current displacement feedback signal via analog switch AS3 as hereinbefore described. This causes the load current feedback signal from conductor 18 to be applied through conductor 48. Capacitor C4 passes the ripple of the load current feedback signal that is limited by diode D7 to ground. This ripple is added to the integral and proportional modes signals at the input of amplifier OP16 to provide the aforementioned dither at the phase-shift input for stabilization purposes.

It will be apparent that when the current feedback signal, voltage proportional to current, on conductor 18 in FIG. 2g exceeds 1.8 volts nominally, equivalent to 90 percent of the motor's rated current, analog switch AS3 is shut off, thereby removing the load voltage-current displacement feedback signal. This causes the system to fully excite the motor, under the control of the reference voltage on conductor 46, so that it can deliver the required torque.

The ability to inhibit the load voltage-current displacement feedback signal gives rise to two important performance features. First, it provides a means for minimum time response to step changes in load. If an A.C. motor were operating with a light load and therefore was under-excited, application of a step load must cause the load voltage-current displacement regulator to respond by reinstating the motor's excitation before the increased load has the opportunity to stall the motor. By inhibiting the feedback signal, maximum force is delivered to the integrator circuit 26 in FIG. 2i, at some time integral gain charged to a high level, causing it to advance to the "full on" state in the least amount of time.

A second benefit provided by the ability to inhibit the feedback signal can be understood by considering the shape of the motor's power factor versus torque curve. Typically, such a curve starts at zero power factor at zero torque. As the torque is increased, the motor's power factor improves until a point is reached, at or below rated torque, where increasing the torque the motor must deliver causes the power factor to decrease. By inhibiting the load voltage-current displacement feedback signal at current levels slightly below rated current, the system will automatically eliminate the undesired part of this double-valued curve.

As hereinbefore mentioned in connection with FIG. 1, the system is provided with a second quadrant detector SQD to inhibit the load voltage-current displacement feedback signal under overhauling load conditions. The circuit diagram for this detector is shown in FIGS. 2c-d. This detector SQD includes a clock synthesizer CS shown at the upper portions of FIGS. 2c-d for developing clock pulses for running the second quadrant detector.

This clock synthesizer provides a pulse every 30 degrees, 12 pulses in every cycle of 360 degrees, to serve as a time base for the second quadrant detector as hereinafter described and shown in the circuit diagram of FIGS. 2a-d and the curves in FIG. 6.

For this purpose, the 30 degree pulse train shown in FIG. 6h is obtained by combining twelve voltage zero crossings, six line-to-line and six line-to-neutral, that occur every electrical cycle, in a 13-bit parity checker generator 4531. As shown in FIGS. 2b-c, the square-wave outputs of buffers BF1, BF2 and BF3 are applied to three inputs of parity checker generator 4531, these being shown in FIG. 6a-c. Also, terminals T1, T2 and T3 of the secondary of transformer ST are connected through delay circuits RC4, RC5 and RC6, and inverting operational amplifiers OP26 and OP27 and non-inverting operational amplifier OP28 to three additional inputs of parity checker generator PT of the 4531 type. The other six inputs of the parity checker generator are connected to "high" at +15 volts. And the 13th input 10 of the parity checker generator is connected to "low" at ground for even parity selection.

The six inputs to the parity checker generator are shown in FIG. 6a-f. Whenever the number of "high" inputs is an even number, the output is "low" and when the number of inputs is an odd number, the output is "high" as shown by the curve in FIG. 6g. As a result, there is provided a pulse train that is low for 30 degrees and then high for 30 degrees and repeats.

This output at terminal 9 of the parity checker generator which is a symmetrical 30 degree pulse train is applied to a dual differentiation circuit 50 which produces a sharp pulse for the leading and also the trailing edge of each square pulse. This is done by the two circuits of this dual differentiation circuit that are of opposite polarity and feed the positive edge at each occurrence of an edge on the 60 degree clock. These pulses are summed by the OR gate which drives a Schmitt trigger circuit 52. The output of this trigger circuit is a train of pulses having the occurrence of a rising edge every 30 degrees as shown in FIG. 6h. This pulse train is then applied through conductor 54 as a time base for the second quadrant detector as herinafter described.

Basically what the second quadrant detector does is to check for conditions indicative of an overhauling load and when such a condition is detected, to lock out the load voltage current displacement feedback signal whereby the load voltage-current reference signal puts the motor across the line, that is, causes full excitation of the motor. This is done by checking the actual displacement between the line L1 to neutral voltage VL1-N and the line L1 current IL1. An overhauling load condition is indicated by such displacement being greatrr than 90 degrees when the motor is across the line or more than 60 degrees when the motor is in a phased-back condition (load voltage-current displacement feedback in effect). When such a condition is detected, the load V-I displacement feedback is inhibited or locked out and when such condition no longer exists, the load V-I displacement feedback is re-established, both with appropriate time delays to allow the system time to settle down to steady-state operation.

This detection of the over 90 degree or over 60 degree V-I displacements is done by the circuit shown in FIGS. 2c-d having 4-stage binary counters BC1-BC4 of the 4520 type, two of which count the 30 degree clock pulses and the other two of which count line L1 voltage cycles, R/S latches RS1 and RS2, one of which latches the feedback inhibit on or off and the other of which latches counter BC2 off, an inverter buffer IB, and a plurality of AND, OR and NOR gates for purposes herinafter described.

Considering now the operation of the second quadrant detector, it will be seen in FIGS. 2b≧d that the line L1 to neutral voltage VL1-N is applied from buffer BF1 to inverter-buffer IB and then in two branches through delay circuits RC7 and RC8 to the reset terminals R of counters BC1 and BC2. Circuits RC7 and RC8 delay this voltage enough to cause these counters to miss the first clock pulse and thus to start counting at 30 degrees, not at 0 degrees. Also, the 30 degree clock pulses are applied from conductor 54 to the clock inputs CL of counters BC1 and BC2, the latter through one input of AND gate AG4, the other input of this AND gate being controlled by a counter-controlled delay circuit hereinafter described.

Binary counter BC1 now counts the clock pulses, one pulse at 30 degrees for an output at Q1, a second pulse at 60 degrees for an output at Q2, a third pulse at 90 degrees for an output at Q1 and Q2 in binary fashion, and a fourth pulse at 120 degrees for an output at Q3. At 90 degrees, counter outputs Q1 and Q2 operate AND gate AG5 which in turn operates OR gate OG1 which then remains operated at 120 degrees directly from counter output Q3, and applies a "high" to one input of AND gate AG6. It will be apparent from the curve in FIGS. 4a that this counting started after the positive to negative zero crossing of the line L1-N voltage VL1-N that removes the reset signal from the counter.

At the same time, the line L1 current has been applied from buffer BF4 to the other input of AND gate AG6. It will therefore be apparent from FIG. 4a that if the line current is positive at 90 degrees and beyond, after the end of the positive half-cycle of voltage, AND gate AG6 will be gated on and its output will be applied through OR gate OG-2 to set a latch RS1 of the 4043 type. As a result, the output of latch RS1 shifts from "low" to "high" that is applied through conductor 52 to perform three functions as follows.

One of these functions is to lock out the load V-I displacement feedback signal to provide the motor with full excitation across the power line. For this purpose, the "high" on conductor 56 is applied to one input of NOR gate NG to hold its output at "low" and thereby prevent the load V-I displacement feedback pulses from passing therethrough via its other input.

Another of these functions of a "high" on conductor 56 is to reset a binary counter BC3 of the 4520 type in FIG. 2c and to hold it in its reset state until it is to be used for counting a 7-cycle delay upon re-establishment of the feedback pulses signal.

The third one of these functions of a "high" on conductor 56 is to set an R/S latch RS2 of the 4043 type in FIG. 2c to inhibit the 30-degree clock pulses from passing to binary counter BC2 until it it is to be used for counting a 60-degree phase displacement after re-establishment of the feedback pulses signal.

Referring back to the aforementioned setting of feedback inhibit latch RS1 in FIG. 2d, it will be apparent that the set signal to this latch is also applied to reset a binary counter BC4 of the 4520 type. The purpose of this binary counter is to count 7-cycles of line L1 voltage and thus to provide a time delay period to delay the re-application of the load V-I displacement feedback signal. This delay is measured after the across-the-line V-I displacement has improved below 90 degrees so as to shut off AND gate AG6 in FIG. 2d and remove the reset signal from counter BC4. If during this 7-cycle counting period the load V-I displacement should again increase to 90 degrees or more, counter BC4 will be reset and will start counting cycles again when such displacement improves below 90 degrees. When counter BC4 passes a count of 7 line voltages cycles, its output Q4 will reset latch RS1, thus causing the load V-I displacement feedback signal to be re-applied.

This delay of substantially 7 cycles is interposed because it takes several cycles for the the motor to be taken across the line, which is the time constant of integrator 24 in FIG. 2h, and thus the 7-cycle delay allows the system to reach steady-state operation before the feedback is reapplied.

This resetting of latch RS1 also removes the reset signal from counter BC3 in FIG. 2c to allow this counter to start counting line voltage cycles applied similarly to its clock input from inverter-buffer IB. This resetting of latch RS1 also removes the set signal from latch RS2 in FIG. 2c to allow this latch to be reset as presently described.

Counter BC3 now counts an additional 7 voltage cycles to provide time for the system to settle down into a steady-state operating condition in its phased-back condition, that is, with load V-I displacement feedback being applied, before allowing counter BC2 to start detecting for overhauling load. These voltage cycles are also applied from the output of inverter-buffer IB to the clock input of binary counter BC3. At the end of this count, output Q4 of the counter resets latch RS2 to provide a "low" at its output which when inverted to a "high" in NOR gate NG6, gates AND gate AG4 to allow 30-degree pulses to pass therethrough to the clock input of counter BC2.

Counter BC2 now detects whether the load is overhauling. If it is not, the load V-I displacement feedback on conductor 8, FIG. 2d, continues to regulate the power to the motor for most efficient power-saving operation. If an overhauling load occurs this is detected by the load V-I displacement exceeding 60 degrees. For this purpose, the zero crossing of the line L1 voltage is delayed by delay network RC8 in FIG. 2c enough so that counter BC2 starts counting at the 30 degree pulse beyond such zero crossing, not at zero degrees at such crossing. That is, this delayed voltage half-cycle is applied to the reset input of counter BC2 to hold it reset until released. After the voltage zero crossing, clock pulses come from conductor 54 through AND gate AG4 to the clock input of counter BC2. At the second clock pulse, 60-degrees V-I displacement indicative of overhauling load, FIG. 4b, output Q2 of the counter is applied through OR gate OG3 to one input of AND gate AG7. At the same time, a line L1 current pulse comes in from buffer BF4 to the other input. It will be seen from FIG. 4b that if the current zero crossing has not yet occurred at the 60-degree timing clock pulse, AND gate AG7 will be gated and will act through OR gate OG2 to set latch RS1 to lock out the feedback signal at NOR gate NG. If the load is not overhauling, counter BC2 will continue to count but its Q2 and Q3 outputs will not pass AND gate AG7 because the current zero crossing has occurred and shut it off at its other input. Output Q3 of counter BC2 stretches the "high" input at AND gate AG7.

Operational amplifier OP26 and reverse diode D10 are provided in FIG. 2h to discharge capacitor C5 of integrator 24 when the start signal is turned off. This will prepare the integrator for another motor start operation. For this purpose when the system is turned from start to stop, the +15 volts at terminal T5 in FIG. 2e goes to zero volts, as does the output of buffer amplifier OP7. This causes the output of amplifier OP8 to shift from −15 volts to +15 volts that is applied through conductor 58 to the inverting input of amplifier OP26. This causes the output of amplifier OP26 to go negative so as to discharge integrator capacitor C5. Whenever the start signal is applied to terminal T5 in FIG. 2e, the output of amplifier OP26 goes to a positive voltage which is a blocking voltage for diode D8 allowing the integrator to operate.

Figure 3:
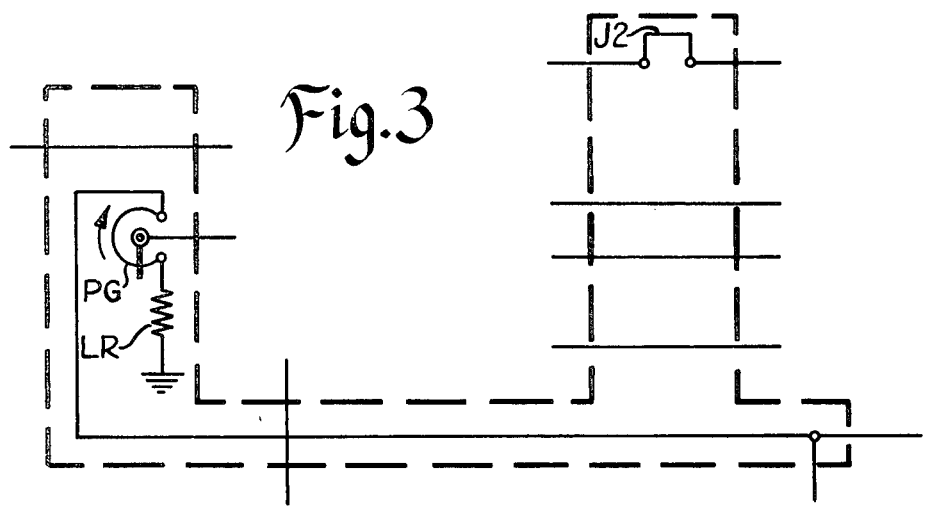
FIG. 3 is a fragmentary circuit diagram for substitution for the broken line enclosed portion of FIG. 2e to provide a current control system with adjustable level and load voltage-current displacement regulator.

Referring to FIG. 3, it will be apparent that when this modification is substituted for the broken-line enclosed portion of FIG. 2e, the current control system will have an adjustable current level rather than the adjustable current ramp hereinbefore described. With this modification, ramp adjusting potentiometer P1 is eliminated and a level adjusting potentiometer P6 is connected from the output of amplifier OP20 through a limiting resistor LR to ground. An adjustable voltage is applied from the tap of this potentiometer to the inverting input of amplifier OP9. This voltage may be set at a selected value downwardly from the approximately 9 volts at the output of amplifier OP20 to a lower limit determined by the relative values of resistor LR and the potentiometer resistor thereby to limit the magnitude of the current reference signal at the output of amplifier OP10.

From the foregoing, it will be apparent that the power-saver load voltage current displacement feedback regulation is shut off during motor start-up and acceleration, then is applied when the motor approaches synchronous speed to limit the power input to what the motor needs for operating at an improved efficiency, and is shut off if the load overhauls the motor (second quadrant operation) until such time as the system returns to the motoring quadrant.

Figure 7:
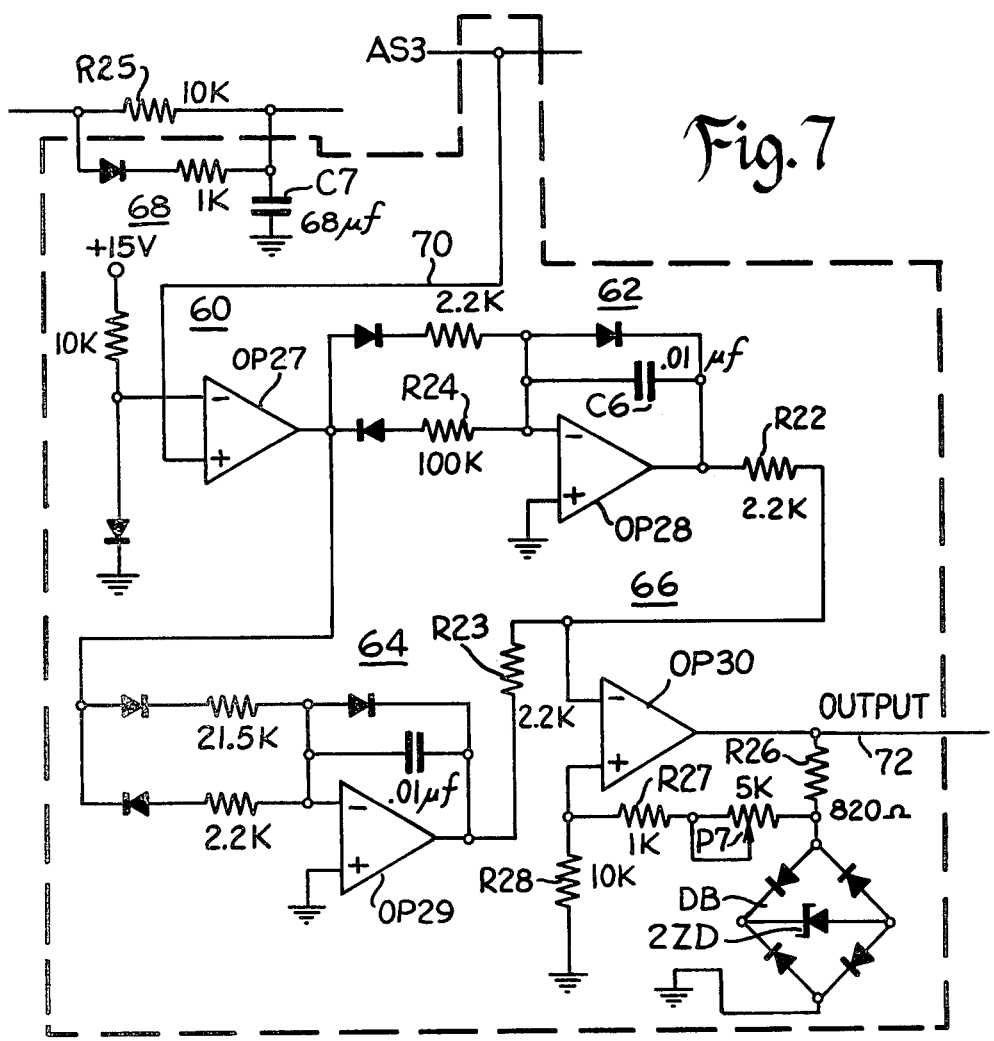
FIG. 7 is a fragmentary circuit diagram for substitution for the broken line enclosed portion of FIG. 2g to provide means for adjusting the gain of the integrator to a particular situation.

A modification of the system is shown in FIG. 7. The purpose of this modification is to provide a means of adjusting the gain of the integrator to a particular situation. For example, if there is a sudden increase in load under phase-back (power-saver) conditions controlled by load voltage-current displacement feedback, it will provide high gain during the transient interval which normally would not be available in the absence of this modification. And after the system has made the required adjustments, it will switch back to low gain.

This modification of FIG. 7 can be incorporated in the system by connecting the same in place of the broken line enclosed portion in FIG. 2g. As shown in FIG. 7, this modification comprises a high gain amplifier 60, a pair of integrators 62 and 64, a Schmitt trigger circuit 66, and a time delay circuit 68. The output of analog switch AS3 is applied through conductor 70 to the high gain amplifier and the output of the Schmitt trigger circuit is applied through conductor 72 and input resistor R21 to transistor TR in FIGS. 2g and 2h. Timing circuit 68 is connected across resistor R25 at the output of amplifier OP25 in FIG. 2g. The operation of this modification will hereinafter be more fully described.

The response of the load voltage current displacement regulator to a step load change is controlled by amplifier OP25 in FIG. 2g which is configured as a voltage level detector. This level detector has been adjusted via the voltage divider established by resistor R20 and potentiometer P5 to respond to a current feedback signal greater than 1.8 volts, if the regulator is operating in the load voltage-current displacement regulator mode. For a fully excited motor, the current feedback signal on conductor 18 has been calibrated such that 2 volts represents rated load, i.e., 2 volts is present when the motor's current is equal to its name plate rating. However, if the motor is under-excited, which is the case if it is operating in the power saver mode, and the motor is supporting light loads, its torque per ampere characteristic changes. Consequently, 1.8 volts is no longer equivalent to 90% load. In fact, a 1.8 volt current feedback signal might be the indication for only a 30 or 40 percent load. Since torque per ampere as a function of motor excitation will vary with motor design, it serves no purpose to speculate what it might be for a typical motor. The point is, once an AC motor becomes under-excited, the calibrated relationship between the magnitude of the signal called load current feedback and the motor current no longer exists. Thus, the output of the level detector (OP25, R20 and P4) which monitors current feedback can be taken only as an indication that the motor's load has increased. Originally, this signal was used to initiate three actions simultaneously; namely, that the ripple current feedback and the load voltage-current displacement feedback signals are inhibited (disconnected) and the integrator's gain is drastically increased. Recall that the purpose of all this was to provide a maximum response to a sudden application of a load to this under-excited motor to prevent the motor from stalling. Tests have shown that what has been said is indeed the case. That is, applying a sudden load to an unloaded, under-excited motor operating under the control of the power saver doesn't stall that motor. The disadvantage of this system is that the motor tends to draw a large current for a short period, perhaps 40 to 60 ms, in response to the load change. Depending on the magnitude of the load change, the peak of the current transient can be as high as the motor's locked rotor rating. This transient is due to the delay that exists between the application of the load and a resulting change in motor's excitation level. The delay is the result of the motor's electrical characteristics and the rather low value of integral gain necessary for stable steady state operation.

Consider then the sequence of events initiated by a sudden increase in load and the regulator's response. The initial reaction to the application of the load is an immediate increase in rotor slip. An instant speed change, of course, is impossible but the sudden application of a load must initiate a dv/dt, change in velocity with respect to time, which can be expressed as the falling back of the rotor's field with respect to the stator's field; a change in angle or a change in position of one with respect to the other. This change in rotor slip, that is, increasing the slip, tends to affect the motor impedance such that the displacement between voltage and current is reduced which, of course, causes a reduction in the average value of the load voltage-current feedback signal. That is to say, the rotor slip changed in such a way that the on-time of the pulses was reduced. Since the period of the pulses, a function of line voltage, is constant, a reduction in pulse on-time reduces the average value of the pulse. If there has been a reduction in the feedback signal, one would think that the regulator would respond by increasing its output which would advance the firing point of the starter's SCR's and thus rectify the situation. To a certain extent this is the case. That is, the regulator's output does change as soon as the feedback signal is changed. The change, however, is due to the proportional channel of the regulator. Its low gain, required for stable under-excited steady state operation, cannot effect a sufficient change to completely support the load change by itself. The integral channel also responds to the load change but its low gain means that it reacts quite slowly to a given error signal. Thus, neither the proportional or the integral channel can provide sufficient reaction in time to respond to the situation that is causing the feedback signal to decrease. All of this means that the motor's excitation is relatively fixed for a short period immediately following the application of load to the motor (3-4 cycles). Consequently, the motor is on its own and must attempt to support the additional load in its under-excited state without any aid from the controller. This it does naturally since the increased load causes a reduction in motor speed. Reducing the motor's speed results in an increased motor slip which allows the motor to draw more current from the relatively fixed voltage source. The current change isn't instant because of the inductance associated with the various leakages; however, the load related component changes much more rapidly than the motor's excitation component. As soon as the motor's current reaches a level that the feedback system can represent as 1.8 volts, the level detector reacts by inhibiting the regulator's feedback signals and drastically increases the integrator's gain. The regulator's output now moves very rapidly to 12 volts which advances the firing points of the SCR's to the maximum "ON⇌" position. The ultimate effect is a very rapid change in the magnitude of the motor's terminal voltage. The rate at which the motor's terminal voltage changes far exceeds the motor's ability to react to it so let us represent the voltage change as a step change. The leakage inductance, of course, will limit the resulting rate of rise of motor current but the reaction of the previously unassisted motor to the sudden load increase resulted in so much rotor slip that the apparent impedance of the motor approaches its locked rotor value. Given the apparent low impedance and the low level of counter voltage, because of the previously under excited state, the response to a sudden increase of the motor's terminal voltage must be a current transient whose magnitude approaches the motor's locked rotor level. Having applied rated voltage to the motor it begins to accelerate. As the motor's speed approaches synchronous speed, the rotor slip begins to decrease, the motor's excitation (field flux) increases, and counter-voltage increases until it reaches its rated value. The result is that the motor's current is reduced to the level needed to support the applied load when it is operated at full field or rated excitation. While the result is acceptable, i.e., the sudden application of rated load did not stall the under-excited motor, the transient current peak equal to the locked rotor value represents a bit of an over reaction. In fact, the 600 or 800 percent current peak could have been limited to perhaps 150 or 200 percent if the regulator had the capability of responding much faster to the sudden load increase. The purpose of the improvement to be described in connection with FIG. 7 is to give the regulator such a capability.

During the previous discussion it was mentioned that the initial reaction of the motor to a load change was a change in rotor slip. Specifically, we said that suddenly increasing the load results in a decreasing load voltage/current displacement feedback signal. The problem is that the low proportional and integral gains required for stable steady state operation prevented the regulator from reacting properly. Thus, the motor had to support or attempt to support the increased load by reducing its impedance so that it could draw the additional current necessary to support that load from the relatively fixed reduced voltage being supplied by the control system. If the regulator could detect the load increase by sensing the reduction in the displacement feedback signal caused by the sudden load increase and respond by dramatically increasing the integral gain, the control system could begin increasing the voltage supplied to the motor almost instantly. Increasing very quickly the motor's terminal voltage tends to minimize the rotor slip because the additional current required by the motor to support the increased load at the higher impedance level is now available as a result of the larger terminal voltage. Thus, by increasing the motor's voltage, a sufficient current is produced with a minimized change in motor impedance (resulting from increased rotor slip) as opposed to keeping a lower constant terminal voltage which results in excessive rotor slip, so that the motor's impedance is reduced to such a value that the equivalent current is present.

As soon as the motor's excitation has reached the proper level for the additional load, the load voltage/current displacement feedback signal will begin increasing until its average value is equivalent to the level established by potentiometer P3, FIG. 2i, the load voltage/current displacement reference. For stable steady state operation, the return of the displacement signal to the level selected by potentiometer P3 must be sensed and the integrator's gain reduced to the original level.

Figure 8:
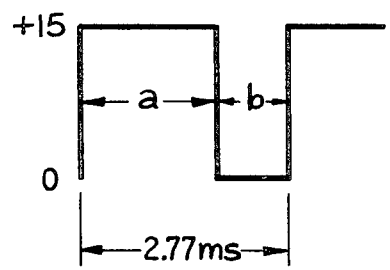
FIG. 8 is a graph shown operating characteristics of the circuit of FIG. 7.

Essentially, the modification shown in FIG. 7 is a switch that is capable of selecting either the externally alterable low integral gain or the internally fixed high integral gain depending on the magnitude of the load voltage/current displacement signal. To achieve the desired response, the switch must be able to decide on a pulse-by-pulse basis whether the high or low integral gain is required. Such a device is shown in FIG. 7. To understand how the switch operates, assume the signal that is being monitored is as shown in FIG. 8. This signal is typical of the load voltage/current displacement feedback signal. Note the period is fixed for 60 Hz at 2.77 ms unless the signal is a fixed high, the displacement is greater than 60°, or low in which case there is no displacement between voltage and current.

Referring to FIG. 7, as soon as the input signal exceeds 0.6 volts, the output of high gain amplifier OP27 goes to plus Vout saturated (12 volts nominal). This voltage is impressed on the inputs of two integrators, OP28 and its associated circuit components and OP29, along with its circuit components. For the condition when the output of amplifier OP27 is plus 12 volts, OP28 is driven to its reset state, a −0.6 volts nominally, in a nominal 23.1 ms. At the same time, OP29, whose output started at +0.6 volts nominally, starts moving in a negative direction. Assume that the pulse "ON" time (a) in FIG. 8 is 2.2 ms which means (b) is 0.57 ms. Further, assume OP30, a Schmitt trigger, is in a state such that its output is (+) 12 volts.

It will take the output of OP29 a nominal 1.995 ms to go from +0.6 volts to a −12 volts. Since the pulse is high for 2.2 ms, the integrator's output will remain at −12 volts until the integrator is reset when the input pulse goes low. The voltage presented to the Schmitt trigger is a negative 6.3 volts (nominal) because of the voltage divider action between output resistors R22 and R23. Since the negative voltage polarity is such that it cannot change the Schmitt trigger's output, it remains at +12 volts. As soon as the input pulse, FIG. 8, goes below +0.6 volts, the output of OP27 switches to a negative 12 volts. The −12 volts resets OP29, its output goes from −12 to +0.6 volts in 23.1 ms approximately, while OP28 and its associated circuitry is released. The output of OP28 begins a ramp which starts at a −0.6 volts and moves toward +12 volts. The gain assigned to the integrator, R24=100 k, C6=0.01 uf, which includes OP28, is such that the output of OP28 will only be 6.84 volts at the end of the low portion of the input signal, (b) shown in FIG. 8 is 0.57 ms. A positive 6.84 volts at the output of OP28 and a positive 0.6 volts from the output of OP29 translates to a positive 3.12 volts at the input of the Schmitt trigger. Since the Schmitt trigger switches at ±5.7 volts, there is still no change which means the output of OP30 remains at a positive 12 volts. Note, the Schmitt trigger is described in much greater detail later. It is understood that as long as successive pulses retain the on- and off-times used in the discussion above, a=2.2 ms, b=0.57 ms in FIG. 8, the switch retains its +12 volt output. This pulse train is identical to the load voltage/current displacement feedback signal when the control system is under-exciting a lightly loaded A.C. motor. The output of the switch is the proper polarity and magnitude to select the low externally adjustable integral gain if that signal is applied to resistor R21 in FIG. 2g.

If a load were to be suddenly applied to our underexcited motor, an increase in rotor slip develops as hereinbefore described. This increase in rotor slip is reported as a change in the "ON" and "OFF" times of the displacement feedback signal. To illustrate the point, refer to FIG. 8 with "a" equal to 1.77 ms and "b" equal to 1 ms. Such a pulse or train of pulses will cause the switch to change state and select the high internally fixed integral gain.

Referring to FIG. 7, assume Schmitt trigger 66 is still set such that its output is high and that the input of OP27 is going high and that this pulse is the first pulse which has the on-time reduced to 1.77 ms and off-time increased to 1 ms. As before, as soon as the input of OP27 is slightly greater than 0.6 volts, the output of OP27 switches from −12 volts (nominal) to a positive 12 volts (nominal). The output of OP28 moves from 6.84 volts, because the previous off-time was 0.57 ms to −0.6 volts in 13.64 ms. At the same time, the output of OP29 begins moving in the negative direction and reaches −11.2 volts at the moment the input pulse begins going low. Since a −0.6 volts at the output of OP28 and −11.2 volts at the output of OP29 translates to a −5.9 volts at the input of OP30 which is the input to the Schmitt trigger whose output is +12, the Schmitt trigger does not change state.

As soon as the input pulse on conductor 70 goes below 0.6 volts, the output of OP27 switches from 12 volts to −12 volts which causes OP29 to reset and OP28 to begin integrating. Starting from the falling edge of the pulse, it takes 21.6 ms to reset OP29 and 1 ms for the output of OP28 to reach 11.4 volts. The 11.4 volts from the output of OP28 combined with a +0.6 volts from the output of OP29 via the voltage divider consisting of resistors R22 and R23 presents an input voltage of 5.7 volts to the Schmitt trigger. Such a signal is sufficient in both magnitude and polarity to switch the Schmitt trigger to its opposite state, i.e., its output switches from +12, its previous state, to −12 volts. This output on conductor 72 is sufficient in magnitude and polarity to select the high internally fixed integral gain when it is applied through resistor R21 to transistor TR. As long as the off-time remains 0.95 ms or more, the switch will select the large integral gain. If the off-time is 1 ms or more the on-time must be 1.82 ms or less.

If the load change was only a 20 or 30 percent increment, as soon as the motor's excitation reaches the level to support the additional load, rotor slip will begin decreasing. The decrease in slip is reported as an increase in on-time and a decrease in off-time; remember a +b =2.77 ms for 60 Hz operation. As soon as the on-time reaches 1.90 ms, OP29 will have sufficient time for its output to reach 11.4 volts which will reset the Schmitt trigger and return the integrator's gain to the low externally adjustable level.

To summarize the first portion of the description concerning the switch, one must remember that it essentially consists of two integrators OP28 and OP29. While the input pulse is low, OP29 is reset and OP28 is integrating. Conversely when the input pulse is high, OP28 is reset and OP29 is integrating. For input pulses representing excessive motor slip (the off-time being equal to or greater than 1 ms), there is sufficient time for the output of OP28 to reach a −11.4 volts which sets the Schmitt trigger to the state that calls for the large internally fixed integral gain. Normal rotor slip, represented by on-times equal to or greater than 1.8 ms, provides sufficient time for the output of OP29 to reach −11.4 volts which drives the Schmitt trigger to the state which selects the low externally alterable gain.

In addition to changing the gain of the integrator, one must have feedback information if the regulation is to remain effective during the transient interval. To provide this feature, the additional circuitry 68 shown at the upper left portion of FIG. 7 is provided. It will be recalled that OP25 along with resistor R20 and potentiometer P5 in FIG. 2g serves as a high gain switch which turned on the A.C. current ripple and displacement feedback signals unless the feedback current was greater than the equivalent of 1.8 volts. Further, it was this switch in the unmodified system which ultimately responded to the current feedback signal and turned off both feedback signals plus altered the integrator's gain. In the modified system, this switch only shuts off the feedback signal and then only after a time delay caused by the discharge of the 68 mfd capacitor C7 into the 10 kΩ resistor. Thus, approximately 0.32 sec. after the output of OP25 goes low, an indication of excessive motor current, both the A.C. ripple current feedback and the displacement feedback signals will be removed from the regulator. This time delay gives the regulator time to deal with the transient conditions associated with a step increase in load which prevents excessive current transients. If the feedback current is greater than 1.8 volts, which for rated excitation is equivalent to 90 percent load, for 0.32 sec. then the load is nearly rated which means the motor should be left across the line and the displacement regulator can be disabled by having its feedback signals removed. Note that the static switch pulse input at conductor 70 is the regulator side of analog switch AS3. Thus, if OP25 turns off, analog switch AS3, either because rated load is present or because the regulator is in the current regulator mode, the switch of FIG. 7 sees a continuous low which directs it to set or maintain the large internally fixed integral gain.

Once the motor is up to speed or at the instant the motor load is removed, OP25 goes to +12 volts nominally which turns analog switches AS3 and AS4 on, thus reapplying both ripple and displacement feed-back signals. Both these conditions are represented by displacement signals which are greater than 60° which means the displacement feedback signal is a steady +15 volts or continuous high. This steady +15 volts causes the static switch of FIG. 7 to select the desired low externally adjustable integral gain which allows the regulator to slowly reduce the motors excitation until the proper reduced excitation level is reached. Again recall that the low integral gain for reducing the excitation or running in a steady state under-excited state is required for stability.

In the Schmitt trigger circuit 66, the purpose of the 820Ω resistor R26, diode bridge DB and 7.5 volt zener diode 2ZD is to guarantee the Schmitt trigger will switch at the same voltage, i.e., ±5.7. Since op amps generally saturate at different levels, (+12 volts −13 volts, for example) the 820Ω resistor, diode bridge, zener diode, and ground connection provide a means such that the junction between the diode bridge and the 820Ω resistor will be 7.5 volts plus 2 diode drops positive or negative (8.7 volts or −8.7 volts) depending on whether the output of OP30 is plus saturated or negative saturated. This voltage is divided by potentiometer P6, and resistors R27 and R28 such that the non-inverting input of OP30 is +5.7 when its output is plus saturated (say +13 volts) and −5.7 volts when its output is negative saturated (say −12 volts). Now, suppose its output is plus 12 volts, then its non-inverting input is +5.7 volts. The only way to get the op amp to switch to the negative saturated state (−13 volts) is to take its inverting input slightly above 5.7 volts. On the other hand, if its output is −13 volts, its non-inverting input is −5.7 volts, the only way to get its output back to +12 volts is to take the inverting input slightly below −5.7 volts. It will be apparent that this FIG. 7 switch works well for either current ramp or limit even though it has been described in connection with the current ramp diagram in FIG. 2a–i.

While the apparatus hereinbefore described is effectively adapted to fulfill the objects stated, it is to be understood that the invention is not intended to be confined to the particular preferred embodiment of load voltage-current displacement regulator motor control system disclosed, inasmuch as it is susceptible to various modifications without departing from the scope of the appended claims.

We claim:

1. A power saver plural-phase fixed frequency A.C. motor control system for driving a load comprising:

means including a phase-shift circuit for starting and accelerating the motor to a running state;

means normally effective to provide current limit regulation during said starting and acceleration of said motor to control the current to the motor;

alternative means for providing the fixed frequency load voltage-current displacement regulation as sensed from the line side, regardless of the waveforms of said voltage and current, in a symmetrically balanced manner with respect to all of the motor phases to reduce the input power to the motor whenever the motor is operating at less than full load especially when unloaded or lightly loaded;

means for sensing a predetermined motor operating condition as the motor approaches full speed;

means responsive to said sensing means for substituting said load voltage-current displacement regulation means for said current limit regulation means to operate said control system in a power saver mode;

said means for providing load voltage-current displacement regulation comprising:

means for generating pulses having a width proportional to the motor voltage and current phase displacement thereby to provide a variable feedback signal comprising:

means for deriving from the line-to-line voltages of said system voltage signals and means for delaying said voltage signals an amount less than thirty degrees so as to have zero crossing points ahead of the respective line-to-neutral voltages of said plural-phase A.C. system;

means for deriving from the line currents of said system current signals having corresponding zero crossing points;

means for generating pulses having a variable width equal to the phase displacement between the zero crossing points of said voltage signals and the respective current signals which pulses are wider than the actual line-to-neutral voltage and current phase displacement thereby to increase said variable feedback signal and enhance the system's response to load changes;

and means responsive to said variable feedback signal for controlling said phase-shift circuit to adjust the power input to the motor to an optimum value thereby to avoid overpowering the load and consequent waste of energy.

2. The power-saver plural-phase A.C. motor control system for driving a load claimed in claim 1, wherein: said predetermined motor operating condition is a speed condition approaching synchronous speed.

3. The power-saver plural-phase A.C. motor control system for driving a load claimed in claim 1, wherein: said predetermined motor operating condition is a motor current value that decreases from its accelerating level to near its running level.

4. The power-saver plural-phase A.C. motor control system for driving a load claimed in claim 1, wherein: said current limit regulation means comprises means providing a current feedback signal and means providing a current limit reference signal having an adjustable ramp for comparison therewith to provide a regulating signal.

5. The power-saver plural-phase A.C. motor control system for driving a load claimed in claim 1, wherein: said current limit regulation means comprises means providing a current feedback signal and means providing a current limit reference signal having an adjustable level for comparison therewith to provide a regulating signal.

6. The power-saver plural-phase A.C. motor control system for driving a load claimed in claim 1, wherein: said means for providing load voltage-current displacement regulation comprises:
means for detecting an overhauling load condition whereby the load drives the motor faster than the intended speed;
and means responsive to said detecting means for inhibiting said variable feedback signal and for causing application of full power to the motor.

7. The power-saver plural-phase A.C. motor control system for driving a load claimed in claim 1, wherein: said plural-phase A.C. motor control system is a three-phase A.C. motor control system;
and said means for generating pulses having a variable width comprises means for limiting the width of said pulses to sixty degrees, their maximum usable width.

8. The power-saver plural-phase A.C. motor control system for driving a load claimed in claim 1, wherein: said plural-phase A.C. motor control system is a three-phase A.C. motor control system;
and said means for generating pulses having a variable width comprises three-input logic gates having said voltage signals and said respective current signals applied to two inputs and an inhibiting signal applied to the third input to limit the width of said pulses to sixty degrees.

9. The power-saver plural-phase A.C. motor control system for driving a load claimed in claim 1, wherein: said plural-phase A.C. motor control system is a three-phase A.C. motor control system having a three-phase A.C. power source;
and said means for providing load voltage-current displacement regulation comprises:
a second quadrant detector for detecting an overhauling load condition;
a pulse generator responsive to said source for generating clock pulses spaced a predetermined number of electrical degrees apart;
means in said second quadrant detector for counting said pulses during a load voltage current displacement period to sense an overhauling load condition and for providing an inhibit signal;
and means responsive to said inhibit signal for shutting off said variable feedback signal.

10. The power-saver plural-phase A.C. motor control system for driving a load claimed in claim 1, wherein: said means responsive to said sensing means also comprises:
means for developing a current ripple signal of limited value;
and means for using said current ripple signal in conjunction with said load voltage-current displacement regulation means pulses to stabilize the reduced voltage point at which the motor is running under load voltage-current displacement feedback control.

11. The power saver plural-phase A.C. motor control system for driving a load claimed in claim 1, wherein said system comprises:
high control gain means normally operable during said starting and acceleration of the motor and alternative low control gain means normally operable during said running state and transfer means therefor;
said motor control system comprises means operable when the control system is operating the motor in the power-saver mode for sensing a sudden increase in motor load;
and means responsive to said sensing means sensing said sudden increase in motor load for causing the system to operate said transfer means to transfer to said high control gain for the transient interval during which the system makes the required adjustments whereafter said sensing means causes the system to operate said transfer means to revert back to said low control gain means.

12. A three-phase A.C. motor control system for driving a load comprising:
control means for starting and accelerating the motor and regulating the operation thereof comprising:
phase-shift control means for controlling the power input to the motor;
current limit regulating means normally operable on starting and accelerating the motor for controlling said phase-shift control means;
said current limit regulating means comprising means providing a current feedback signal and a current limit reference signal for comparison therewith to provide a current control signal;
said current limit regulating means also comprising mode means affording integral and proportional modes of control of said current control signal to provide a phase-shift input signal to said phase-shift control means, said means affording integral control of said current control signal including means providing a predetermined high gain;
load voltage-current displacement regulating means normally inoperative;
means for sensing that said motor is approaching synchronous speed;
and means responsive to said sensing means for rendering said load voltage-current displacement regulating means operative and simultaneously rendering said current feedback and current reference signals inoperative;

said load voltage-current displacement regulating means comprising means providing a load voltage-current displacement feedback signal and a load voltage-current displacement reference signal of desirable value for comparison therewith to provide a resultant control signal;

said load voltage-current displacement regulating means comprising said means affording proportional control for controlling said resultant control signal and low-gain means affording integral control of said resultant control signal;

means also responsive to said sensing means for switching from said high-gain integral control means to said low-gain means;

and means responsive to said integral and proportional control means for controlling said phase-shift control means to regulate the power input to the motor.

13. The plural-phase A.C. motor control system for driving a load claimed in claims 1 or 12, wherein:

said load voltage-current displacement regulating means comprises means to adjust the input power to the motor only during conditions which are essentially less than rated current driving conditions to avoid the overload region where the load voltage-current displacement decreases with increasing load.

14. The plural-phase A.C. motor control system for driving a load claimed in claim 12, wherein:

said proportional control means and said low-gain integral control means comprise means affording individual adjustment of the respective gains thereof.

15. A three-phase A.C. motor control system for driving a variable load comprising:

control means for starting and accelerating the motor and regulating the operation thereof comprising:

phase-shift control means for controlling the power input to the motor;

current regulating means operable for controlling said phase-shift control means comprising:

means providing a current feedback signal and a current reference signal for comparison therewith to provide a current control signal;

mode means comprising alternative high gain and low gain integral mode control means for controlling said current control signal to provide a phase-shift input signal to said phase-shift control means;

and current feedback signal responsive means normally operable on starting and accelerating the motor for rendering said high gain integral mode control means operative to provide very fast current regulation;

said three-phase A.C. motor control system also comprising:

load voltage-current displacement regulating means normally inoperative on starting and accelerating the motor;

means for sensing that said motor is approaching synchronous speed;

means responsive to said sensing means for rendering said load voltage-current displacement regulating means and said low gain integral mode control means operative and simultaneously rendering said current feedback and current reference signals and said high gain integral mode control means inoperative;

said load voltage-current displacement regulating means comprising means providing a load voltage-current displacement feedback signal to said mode means;

and said low gain integral mode control means being responsive to said load voltage-current displacement feedback signal for controlling said phase-shift control means to phase back the power input to the motor on decrease in load.

16. The three-phase A.C. motor control system for driving a variable load claimed in claim 15, wherein:

said load voltage-current displacement regulating means comprises:

means for sensing a sudden increase in motor load while the motor control system is operating under phase-back conditions;

and means responsive to said sudden load increase sensing means for rendering said high gain integral mode control means operative for a transient interval long enough to enable said motor control system to adjust thereto.

17. The three-phase A.C. motor control system for driving a variable load claimed in claim 16, wherein:

said means for sensing a sudden increase in motor load while the motor control system is operating under phase-back conditions comprises means for sensing a change in said load voltage-current displacement feedback signal.

18. The three-phase A.C. motor control system for driving a variable load claimed in claim 16, wherein:

said means for sensing a sudden increase in motor load while the motor control system is operating under phase-back conditions comprises means for sensing a decrease in said load voltage-current displacement feedback signal.

* * * * *